(12) United States Patent
Rogers

(10) Patent No.: US 12,519,316 B2
(45) Date of Patent: Jan. 6, 2026

(54) GENERATION LOAD CONTROL

(71) Applicant: GNG Electrical Pty Ltd, Tweed Heads (AU)

(72) Inventor: Gregory Neville Rogers, Tweed Heads (AU)

(73) Assignee: GNG Electrical Pty Ltd, Tweed Heads (AU)

( * ) Notice: Subject to any disclaimer, the term of this patent is extended or adjusted under 35 U.S.C. 154(b) by 557 days.

(21) Appl. No.: 17/543,222

(22) Filed: Dec. 6, 2021

(65) Prior Publication Data

US 2022/0094170 A1 Mar. 24, 2022

Related U.S. Application Data

(63) Continuation of application No. 15/311,484, filed as application No. PCT/AU2015/000280 on May 15, 2015, now abandoned.

(30) Foreign Application Priority Data

May 15, 2014 (AU) ................................ 2014901798

(51) Int. Cl.
*H02J 3/14* (2006.01)
*H02J 3/38* (2006.01)
(Continued)

(52) U.S. Cl.
CPC .............. *H02J 3/381* (2013.01); *H02J 3/14* (2013.01); *H02J 3/388* (2020.01); *H02M 7/44* (2013.01);
(Continued)

(58) Field of Classification Search
CPC .... H02J 3/14; H02J 3/382; H02J 3/383; H02J 3/386; H02J 2003/143; H02M 7/04;
(Continued)

(56) References Cited

U.S. PATENT DOCUMENTS 5,293,447 A * 3/1994 Fanney ............... F24D 19/1057
136/248
6,037,758 A 3/2000 Perez
(Continued)

FOREIGN PATENT DOCUMENTS

DE 102012103081 A1 10/2021
FR 2991823 A1 12/2013
(Continued)

OTHER PUBLICATIONS

Non-Final Office Action issued in corresponding U.S. Appl. No. 15/311,484, mailed on May 11, 2018.
(Continued)

*Primary Examiner* — Elim Ortiz
(74) *Attorney, Agent, or Firm* — Dinsmore & Shohl LLP

(57) ABSTRACT

This invention relates to a device for controlling at least one of a plurality of electrical loads that are being supplied by at least one renewable energy generator and/or an electrical mains supply. The device comprises an energy sensor for measuring an energy parameter, wherein the energy parameter equates to a value representative of the amount of energy output by the energy sensor, the energy parameter of the energy sensor being directly proportional to the output of the at least one renewable energy generator; a controller means for determining the amount of electrical loads that can be connected or disconnected on the basis of the measured energy parameter; a switching device for connecting and disconnecting the at least one electrical load based on an output of the controller means; and wherein as the energy parameter varies the output of the controller means varies to connect and disconnect electrical loads.

24 Claims, 19 Drawing Sheets

(51) Int. Cl.
  *H02M 7/04* (2006.01)
  *H02M 7/44* (2006.01)

(52) U.S. Cl.
  CPC ....... *H02J 2300/20* (2020.01); *H02J 2300/24* (2020.01); *H02J 2300/28* (2020.01); *H02J 2310/14* (2020.01); *Y02B 70/30* (2013.01); *Y02B 70/3225* (2013.01); *Y02E 10/56* (2013.01); *Y02E 10/76* (2013.01); *Y04S 20/222* (2013.01); *Y04S 20/242* (2013.01)

(58) Field of Classification Search
  CPC .. H02M 7/44; Y02B 70/3225; Y02B 70/3266; Y02E 10/563; Y04S 20/222; Y04S 20/242
  USPC ......... 700/7.35, 297, 291, 295, 286; 307/11, 307/16, 18, 57, 58, 82, 83, 84
  See application file for complete search history.

(56) References Cited

U.S. PATENT DOCUMENTS

| | | | |
|---|---|---|---|
| 2009/0027932 A1* | 1/2009 | Haines | H02J 9/062 363/95 |
| 2011/0276269 A1* | 11/2011 | Hummel | H02J 3/383 702/3 |
| 2012/0078433 A1 | 3/2012 | Honma et al. | |

FOREIGN PATENT DOCUMENTS

| | | |
|---|---|---|
| WO | 2008/138016 A1 | 11/2008 |
| WO | 2009/141651 A2 | 11/2009 |
| WO | 2010/094012 A1 | 8/2010 |

OTHER PUBLICATIONS

Feb. 23, 2018 Office Action issued in Chinese Patent Application No. 201580038344.4.
Mar. 9, 2018 Search Report issued in European Patent Application No. 15793551.1.
Non-Final Office Action issued in corresponding U.S. Appl. No. 15/311,484, mailed on Mar. 7, 2019.
Final Office Action issued in corresponding U.S. Appl. No. 15/311,484, mailed on Nov. 26, 2019.
Non-Final Office Action issued in corresponding U.S. Appl. No. 15/311,484, mailed on Sep. 30, 2020.
Final Office Action issued in corresponding U.S. Appl. No. 15/311,484, mailed on Jul. 6, 2021.
Communication Pursuant to Article 94(3) EPC, dated Jun. 3, 2024, pertaining to European Application 15793551.1, filed Dec. 13, 2016.
Chinese Office Action pertaining to application No. 201580038344.4 dated Jan. 2, 2024.
Australian Examination Reporting pertaining to application No. 2023237040 dated Aug. 23, 2024.
European Examination Report pertaining to application No. 15793551.1 dated Sep. 11, 2024.
SMA Solar Technology AG "Planning Guidelines SMA Smart Home The System Solution for more Independence" Dec. 31, 2013.

* cited by examiner

GENERATION LOAD CONTROL

FIELD OF THE INVENTION

This invention generally relates to renewable energy generation within a utility grid. In particular, the present invention relates to a system, method and device for controlling the distribution of renewable energy to one or more loads. Embodiments of the present disclosure relate generally to green technologies.

BACKGROUND OF THE INVENTION

Reference to any prior art herein should not be taken as an acknowledgement that such prior art constitutes any part of the common general knowledge in the relevant field of technology at the priority date of the application.

Electricity, or electrical power, is an essential part of modern life. In residences, businesses, institutions and in other locations, consumers use electricity in a variety of ways. Utilities deliver electrical power generated by power plants through a network of transmission and lines and transformers. This network is hereinafter referred to as the "power transmission and distribution grid," "the electricity grid," "the grid," or "power grid."

In order to reduce carbon dioxide emissions, households and businesses are encouraged to install devices that capture energy from renewable energy sources such as solar radiation, air and ground heat, wind, waves and tides. Renewable energy devices can take various forms including for example, solar water heaters, solar photovoltaic generators, wind turbines, and wave and tide generators. Renewable power generation systems, for example, wind and solar energy generation systems, offer various advantages including provision of safe electrical power from a virtually inexhaustible supply. In addition to their environmental aspects, renewable energy sources also include advantages such as low power transmission loss and security of supply since the energy production is usually located close to the power consumer thereby reducing the transmission distance.

However, instability of energy supply from renewable sources due to change of wind strength, climatic and seasonal variations of solar energy creates obstacles with respect to supplying consumers with reliable electrical energy and therefore, end consumers generally remain connected to the main power grid. Peak electrical power used by most businesses and homes is generally during daylight hours, especially during summer months when air conditioning demand is at its greatest. Geographical regions that are sunny are ideal for solar energy collection, such as with photovoltaic cells. Typically, collected solar energy is used to either charge a power storage device, such as a battery, which can then be used to power lights in the evening, or converted into AC and supplied to a load that is usually supplied with grid power.

Whist there is continued encouragement provided to households and businesses to install devices that capture energy from renewable energy sources for personal consumption and to provide any over-supply of electrical power into the power grid, there are problems associated with individual households and businesses supplying power back into a power grid that are either not well understood or not widely known.

For example, in instances where a number of household or businesses are geographically co-located, an over-supply of electrical power back into the power grid from those households and businesses causes localised voltage regulation problems. Of course, voltage regulation is an important parameter when considering the Power Quality provided by electrical power generators through the power grid to end consumers. In the event that the voltage regulation is affected such that voltages either increase or decrease beyond the usually accepted voltage thresholds, households and businesses will notice the voltage increases and decreases. Whilst excessive voltages can have the effect of damaging equipment connected to power grid, the effect of voltages failing to remain within the usual voltage regulation parameters is most noticeable by lighting becoming either much brighter or much dimmer than they would normally operate. Inability to maintain voltage regulation within acceptable thresholds affects the operation of electrical loads and the expected operational life of many electrical devices.

As consumers are increasingly encouraged to connect more renewable energy sources for personal consumption, and are also encouraged to provide any over-supply of electrical energy back into the grid, the problems associated with maintaining Power Quality to end consumers across an entire power grid increases.

Another problem faced by end consumers seeking to reduce the costs associated with their consumption of electrical power from a power generation and distribution utility is the substantial impost that is levied in the event that the end consumer exceeds a "peak demand" threshold. In this regard, network distribution utilities generally establish a "peak demand" threshold and in the event that any end consumer exceeds that threshold, the network utility increases the service charge per kilowatt hour for provision of electrical power greater than that threshold. The rationale for establishing peak demand threshold is due to the capital cost associated with providing a network that is capable of supplying a peak power load.

Accordingly, network utilities who operate a power grid seek to discourage end consumers drawing electrical power above a certain threshold and particularly, at peak demand periods during the day since to supply all end consumers with a peak demand during a peak period establishes the maximum amount of power required to be supplied across the network. The total peak power demand upon a network generally establishes the capital cost required to provide power sufficient to satisfy that peak demand. The impost levied by network utilities has the effect of both discouraging end consumers from requiring electrical power from the grid above a certain threshold and also, extracts a premium price from any end consumer who exceeds the peak demand threshold to contribute toward the capital cost associated with providing a network capable of providing that peak demand. Effectively, the network utilities implement a "user pays" policy such that those end consumers who exceed the peak demand threshold are required to pay a premium price with reflects the increased capital cost of establishing a network that can provide the peak power demand.

As a result, end users are faced with the problem of paying a premium for any electrical power that they require that exceeds the peak demand threshold established by the network provider. Accordingly, many end consumers seek to avoid drawing power from the network that exceeds the peak demand threshold and therefore, have installed efficient renewable energy sources that will provide sufficient electrical power to reduce their power draw from the power grid during periods of peak demand.

Having installed sufficient renewable energy sources to accommodate their peak demand, many end consumers find that they have an over-supply of electrical energy from their renewable energy sources and subsequent to the peak demand period, it is possible for the end consumer to supply energy from their renewable energy sources back into the power grid. In view of the aforementioned problem associated with insufficient localised voltage regulation where consumers are located within a close geographical region, the problem confronted by end consumers is complex since they are confronted with the competing demands of avoiding drawing electrical power from a network that exceeds the peak demand threshold whilst at the same time seeking to avoid supplying excess supply of electrical power back into the power grid which causes localised voltage regulation problems and affects the quality of power provided to all end consumers in the local geographical region.

Clearly it would be advantageous if a device for isolating and controlling the distribution of electrical energy to a load either from a local renewable energy source or a conventional power grid could be devised that at least ameliorates some of the problems described above. In particular, it would be beneficial if a device which has the ability to regulate the load and take advantage of the energy produced during peak production from a renewable energy system, or to at least provide a useful alternative.

Further, it would be advantageous if a device were available to monitor the direction of flow of electrical power through a main switch (i.e. either power flow from a power grid to a premises or from a premises to a power grid) in addition to the amount of power flowing through the main switch and controlling the connection and/or disconnection of loads and distribution of electrical energy to loads from renewable energy sources according to a user's defined preference.

SUMMARY OF THE INVENTION

In accordance with a first aspect, the present invention provides a load controlling device for controlling the connection of at least one of a plurality of electrical loads, said plurality of electrical loads being supplied by at least one renewable energy generator or an electrical mains supply, wherein the at least one renewable energy generator derives energy from a renewable energy source; said load controlling device comprising: an energy sensor for measuring an energy parameter, wherein the energy parameter is a value representative of the amount of renewable energy output by the energy sensor, the energy parameter of the energy sensor being directly proportional to the output of the at least one renewable energy generator; a controller means that determines the amount of electrical loads that can be connected or disconnected according to the measured energy parameter; a switching device for connecting and disconnecting the at least one electrical load based upon an output of the controller means and whereas the energy parameter varies the output of the controller means varies to connect and disconnect electrical loads.

In an embodiment, the renewable energy generator and renewable energy source may be any one or more of the following: a) solar photovoltaic generators; b) wind turbine; c) wave and tide generators; or d) hydroelectricity generated by use of the gravitational force of falling or flowing water.

In a solar photovoltaic generator (which generates DC power) the energy sensor may comprise a solar photovoltaic panel with similar characteristics arranged with substantially the same orientation and inclination as the at least one solar photovoltaic generator, such that the energy parameter and the amount of energy output by the photovoltaic panel is directly proportional to the amount of energy output by the at least one solar photovoltaic generator. The energy parameter and the amount of energy output by the photovoltaic panel may be a percentage of the amount of energy output by the at least one solar photovoltaic generator.

Alternatively, in a solar photovoltaic generator the energy sensor may comprise a solar irradiance meter located using substantially the same orientation and inclination as the at least one solar photovoltaic generator, such that the energy parameter and the amount of energy output by the solar irradiance meter is directly proportional to the amount of energy output by the at least one solar photovoltaic generator. The switching device may close and open as the value of the solar irradiance meter increases and decreases for the purpose of connecting and disconnecting the electrical loads.

Alternatively, in a solar photovoltaic generator, the energy sensor may comprise a bi-directional voltage and/or current sensing device which senses the DC voltage, current and power from the at least one solar photovoltaic generator. The energy sensor may be located in any one or more of the following locations: a) on the DC side of the inverter; b) at or near the DC isolation switch at the output of the photovoltaic generator; and/or c) in parallel with one or more photovoltaic panels in the photovoltaic generator.

A solar photovoltaic generator may further comprise an inverter for converting the direct current (DC) from the solar photovoltaic generator to alternating current (AC). The energy sensor may comprise a bi-directional voltage and/or current sensing device which senses the AC voltage, current and power from the inverter.

The energy sensor may comprise a bi-directional voltage and/or current sensing device which is built in, or is a plug and play device, for the inverter to sense the AC voltage, current and power. The inverter may be programmable to recognize its output power and be operable to connect or disconnect an electrical load as the output of the inverter varies with the energy parameter.

The energy sensor may comprise a bi-directional voltage and/or current sensing device which senses the AC voltage, current and power at the electrical mains supply.

The current sensing device may be a whole current measuring device. Alternatively, the current sensing device may be a current transformer which uses a primary conductor as the primary winding and a secondary coil that is coiled around a toroidal core that is positioned around a main conductor to measure the current. The voltage sensing device may be a voltage transformer or an electric potential transformer such as an instrument transformer.

The controller means may further comprise a processing means that receives a signal representing the energy parameter as an input and determines the amount of electrical load that can be connected or disconnected to accommodate the amount of available power from removable energy sources. The processing means may be a microprocessor.

The processing means may further comprise a switch on value and a switch off value for controlling the amount of load that is connected or disconnected as the energy parameter varies. The switch off value and the switch on value may be two different values. The switch on value and the switch off value may be variable controllable which can be manually adjusted or may be automatically adjusted according to computer instructions code executed by the microprocessor.

The switching device may further comprise an electrically controlled switch operable by the processing means to connect or disconnect electrical loads. The electrically controlled switch may comprise a switching circuit in the controller means and an electromagnetic coil and contacts located in line with the at least one electrical load to connect or disconnect the at least one electrical load.

The device may comprise a plurality of electrically controlled switches that are operable by the processing means to connect or disconnect a plurality of electrical loads. The switches and associated electrical loads may be connected or disconnected to control the amount of electrical power consumed as the energy parameter varies. The switches and associated electrical loads operable according to computer instruction code executed by the processing means and programmed to control the amount of load that is connected or disconnected as the energy parameter varies.

The plurality of electrical loads may comprise at least one controlled load and at least one uncontrolled load. The plurality of loads may comprise fixed and variable loads. At least one of the controlled loads may comprise at least one variable load. The processing means, may under the control of computer instruction code, cause supply of electrical power to the variable load with a varying amount of power to suit the variable load.

The load controlling device may comprise a data network for transferring information between the plurality of electrical loads, the renewable energy generator, the energy sensor, the controller means, the switching device and the electrical mains supply.

In accordance with a further aspect, the present invention provides a method for controlling at least one of a plurality of electrical loads, said plurality of electrical loads being supplied by at least one renewable energy generator or an electrical mains supply, wherein the at least one renewable energy generator derives energy from a renewable energy source; said method comprising measuring an energy parameter using an energy sensor; determining the amount of electrical loads that can be connected or disconnected by a controller on the basis of the measured energy parameter; connecting and/or disconnecting the electrical loads based on an output of the controller means; and wherein the energy parameter is a value representative of the amount of renewable energy output by the energy sensor, the energy parameter of the energy sensor being proportional to the output of the at least one renewable energy generator.

In accordance with a further aspect, the present invention provides computer instruction code executable on a computer processor for controlling at least one of a plurality of electrical loads, said plurality of electrical loads being supplied by at least one renewable energy generator or an electrical main supply, wherein the at least one renewable energy generator derives energy from a renewable energy source; the computer instruction code causing the measurement of an energy parameter using an energy sensor; determination of the amount of electrical loads that can be connected or disconnected by a controller according to the measured energy parameter; causing the connecting and/or disconnecting of electrical loads based upon an output of the controller wherein the energy parameter is a value representative of the amount of renewable energy output by the energy sensor, the energy parameter of the energy sensor being proportional to the output of the at least one renewable energy generator.

BRIEF DESCRIPTION OF THE DRAWINGS

The present invention will be understood more fully from the detailed description given hereinafter and from the accompanying drawings of one or more embodiments of the present invention, which, however, should not be taken to be limiting to the invention, but are for explanation and understanding only.

DETAILED DESCRIPTION OF EMBODIMENTS

Figure 1:
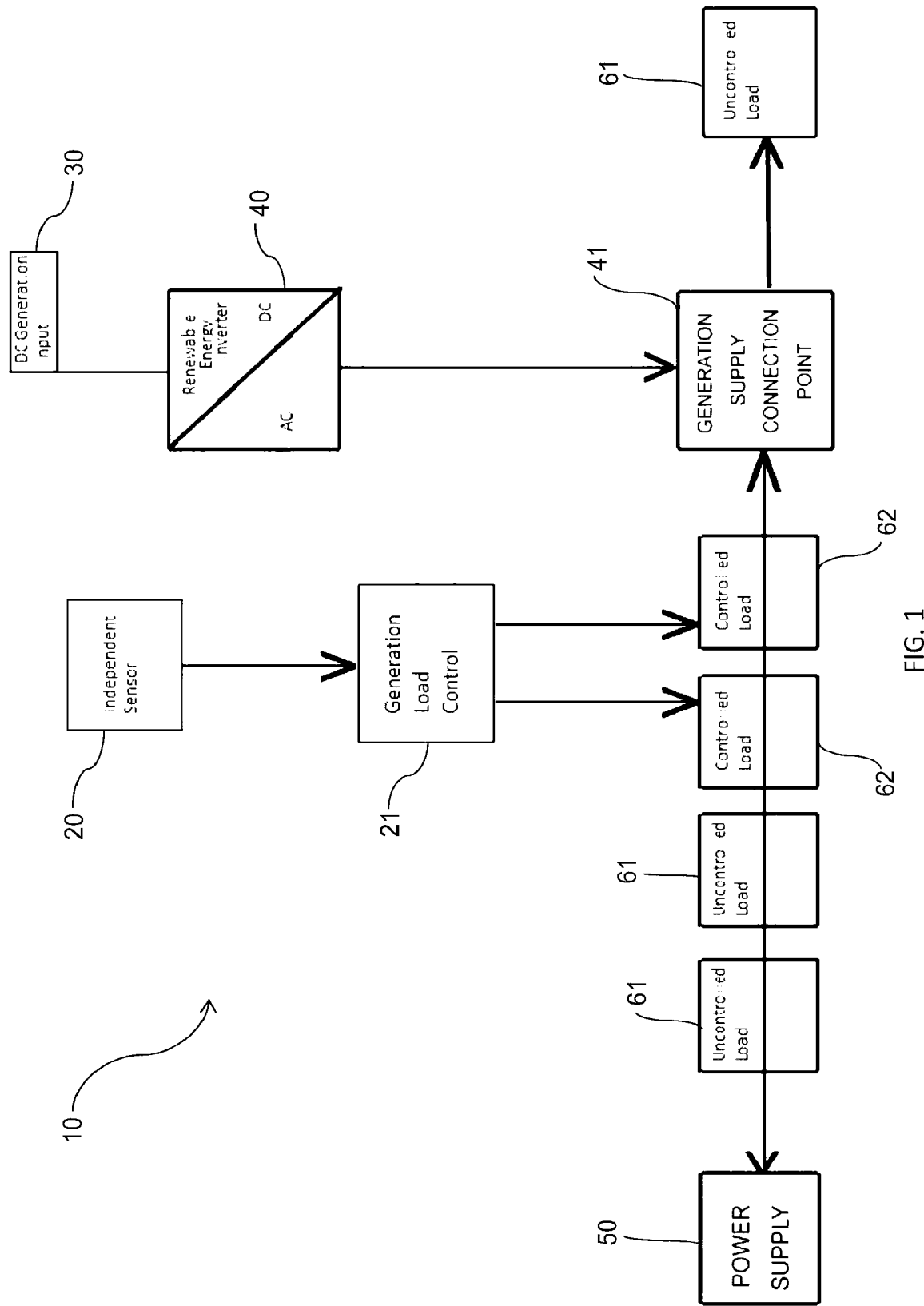
FIG. 1 is a block diagram of an embodiment of a device using an independent sensor in accordance with the present invention.

The following description, given by way of example only, is described in order to provide a more precise understanding of the subject matter and one or more embodiments of the invention.

The described embodiments relate generally to a load controlling device 10 for controlling at least one of a plurality of electrical loads 62. The electrical loads are supplied by a renewable energy generator and/or an electrical mains supply, the renewable energy generator deriving energy from a renewable energy source. An embodiment of a device according to the present invention is typically used for solar photovoltaic fed grid installations for the purpose of switching electrical loads on and off dependent upon the amount of renewable energy output by an energy sensor. The amount of renewable energy output by the energy sensor being proportional to the output of the renewable energy generator.

Renewable energy is obtained from resources which are continually replenished such as sunlight, wind, rain, tides, waves and geothermal heat. Therefore the present invention is not limited to any particular source of renewable energy. For example, in addition to solar systems, wind turbines have also been employed to provide clean or renewable energy. Wind turbines generate AC power from the kinetic energy of the wind through a system comprising a rotator, a gearbox and a generator. The AC power is rectified into a DC power and is further converted into AC power with the same frequency as the AC power available from the local power grid. Likewise, hydroelectricity is the term used to refer to electricity generated by hydropower, the production of electrical power through the use of the gravitational force of falling or flowing water.

Photovoltaic (PV) is a method of generating electrical power by converting solar radiation into direct current electricity using semiconductors that exhibit a photovoltaic effect. Photovoltaic power generation employs solar panels composed of a number of solar cells containing a photovoltaic material. A PV system is made up of one or more photovoltaic (PV) panels, a DC/AC power converter or inverter, electrical interconnections, and associated switches and contactors. The electricity generated can be either stored, used directly (island/standalone plant), or fed into the electricity grid, or combined with one or many domestic renewable energy generators to feed into a small grid.

The following description is based upon an embodiment using solar energy and the use of photovoltaic panels. However, the production of renewable energy is not limited solely to such use. Likewise, isolation referred to in the following paragraphs refers to both electrical and mechanical isolation. Therefore isolation for both the mains grid and the renewable energy supply may incorporate both mechanical and electrical isolation in order to protect both the mains and the renewable energy supplies and their associated components.

The mains power supply or grid supply provides electricity in the form of general-purpose alternating-current (AC) electric power. Worldwide, many different mains power systems are available for the operation of household and light commercial electrical appliances and lighting. The main differences between the systems are primarily characterised by their voltage, frequency, plugs and sockets (receptacles or outlets), and earthing system (grounding). The load controlling device 10 may be connected to a single phase system or a multiphase or polyphase system.

The mains power or grid supply is fed via transmission lines to dwellings and typically via a consumer meter. Incorporating grid fed renewable energy generating equipment, means when a customer is generating more electricity than required for their own use, the surplus may be supplied back to the power grid. Customers that generate and supply power back into the "grid" usually have special equipment and safety devices to protect the grid components (as well as the customer's equipment) in case of faults (electrical short circuits) or maintenance of the grid.

The present device 10 is used for solar photovoltaic fed grid installations for the purpose of switching electrical loads on and off depending upon the amount of renewable energy output by an energy sensor. In other words, the loads are switched depending upon the amount of energy that is available from the photovoltaic energy generator which forms a DC generation input. The amount of energy available is determined by the amount of solar irradiance which is available to generate power from the photovoltaic generator.

Solar PV systems, along with wind and hydro systems can be collectively referred to as Inverter Energy Systems (IES). When connected to the network, these systems can feed electricity back into the grid. Therefore, an IES comprises a system with a DC energy source and an inverter for transferring the DC energy source to an AC load. The IES performs the conversion of the variable DC output of the generation source module (solar PV) into a utility frequency AC power that can be fed into the supply network.

Solar irradiance is the measure of the irradiance (power per unit area on the Earth's surface) produced by the sun in the form of electromagnetic radiation, which is perceived by humans as sunlight. Although the energy output of the Sun is relatively constant, solar irradiance varies significantly from one geographic location to another, due to changes throughout the year as the weather changes in any particular location. The most intense irradiance is experienced by those regions that are not at an angle to the sun as the earth rotates. The solar cells which produce direct current (DC) power provide fluctuating output as the sunlight's intensity or irradiance varies. Therefore, the output of a solar cell will vary as the solar irradiance varies_ As will be recognised by skilled readers, this places a particular burden on accurately determining the amount of electrical load which can be adequately supplied by any particular solar installation and when that load can be satisfied.

FIG. 1 illustrates an embodiment of the present invention in which load control device 10 comprises an independent sensor 20 which is utilised to measure the solar irradiance. Preferably the energy sensor 20 is a PV panel which has similar characteristics to the PV's used in the DC generator 30. Alternatively, the energy sensor 20 may be a solar irradiance meter located adjacent to the DC generator 30 or solar photovoltaic generator 30. The sensor 20 is generally positioned adjacent to the DC generator 30 and using the same orientation and inclination as the DC generator 30. As will be appreciated by skilled readers, the energy sensor 20 is designed to output an amount of energy which is directly proportional to the amount of energy being output by the DC generator 30.

Typically the solar irradiance meter comprises a sensor or detector such as a silicon photodiode packaged in a hermetically sealed container which provides an output reading of solar irradiance or the power per unit area radiated by a surface. The SI units for these quantities are watts per square meter (W/m$^2$).

The energy sensor 20 provides an output which is supplied to the input of the load controller 21. The load controller 21 converts the output of the energy sensor 20 to a value or energy parameter which is typically a percentage which is directly proportional to the output of the DC generator 30. For example, if the energy sensor 20 was a 200 W solar panel at 50% the output of the solar panel would be 100 W and at 200 W the output would be 100%. Given that the solar irradiance is a varying quantity, this same variation would be expected from the DC generator 30. Therefore when the energy sensor 20 is outputting 50% (100 W) then the DC generator 30 would also be outputting 50%. For a 10 kW setup the output of the DC generator at 50% would be 5 kW.

Using the above example, the generator load controller 21 can be switched to therefore control a total of 5 kW in controlled loads 62. This could be one electrical load 62 which requires 5 kW or could be two 2.5 kW electrical loads 62. Likewise as will be described below in relation to FIGS. 11 and 12, the electrical load may also be a variable load 100 which requires a variable input of 0 to 5 kW for operation.

The present invention allows connection of additional controlled loads or loads 62 to a site as the amount or availability of solar energy or irradiance increases. Therefore, the present invention envisions only running the controlled loads 62 when the solar energy is available. Likewise it also provides the ability to turn off the connected loads 62 when the solar energy or solar irradiance decreases.

Figure 2:
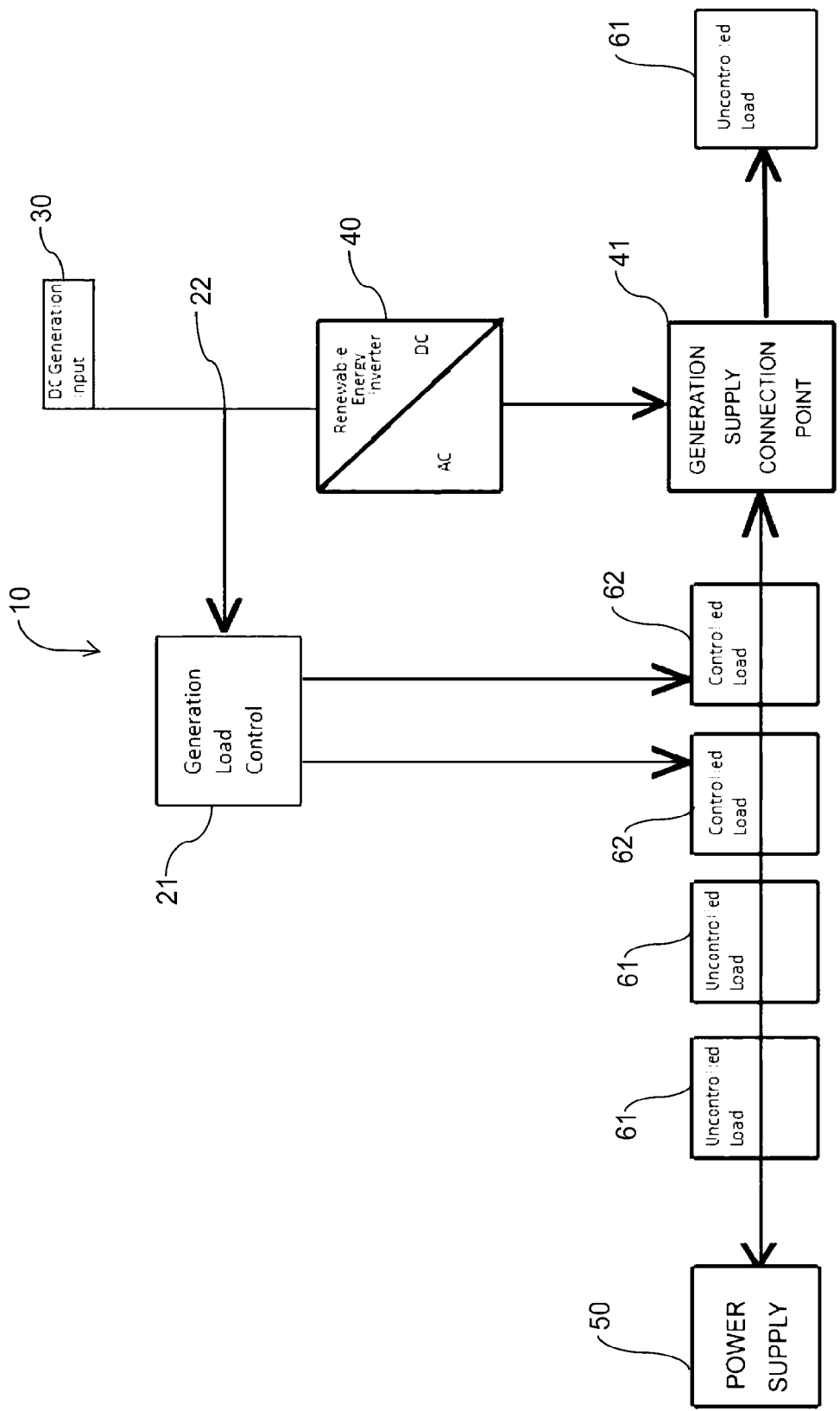
FIG. 2 illustrates a block diagram of the device using a DC side sensing in accordance with an embodiment of the present invention.
Figure 3:
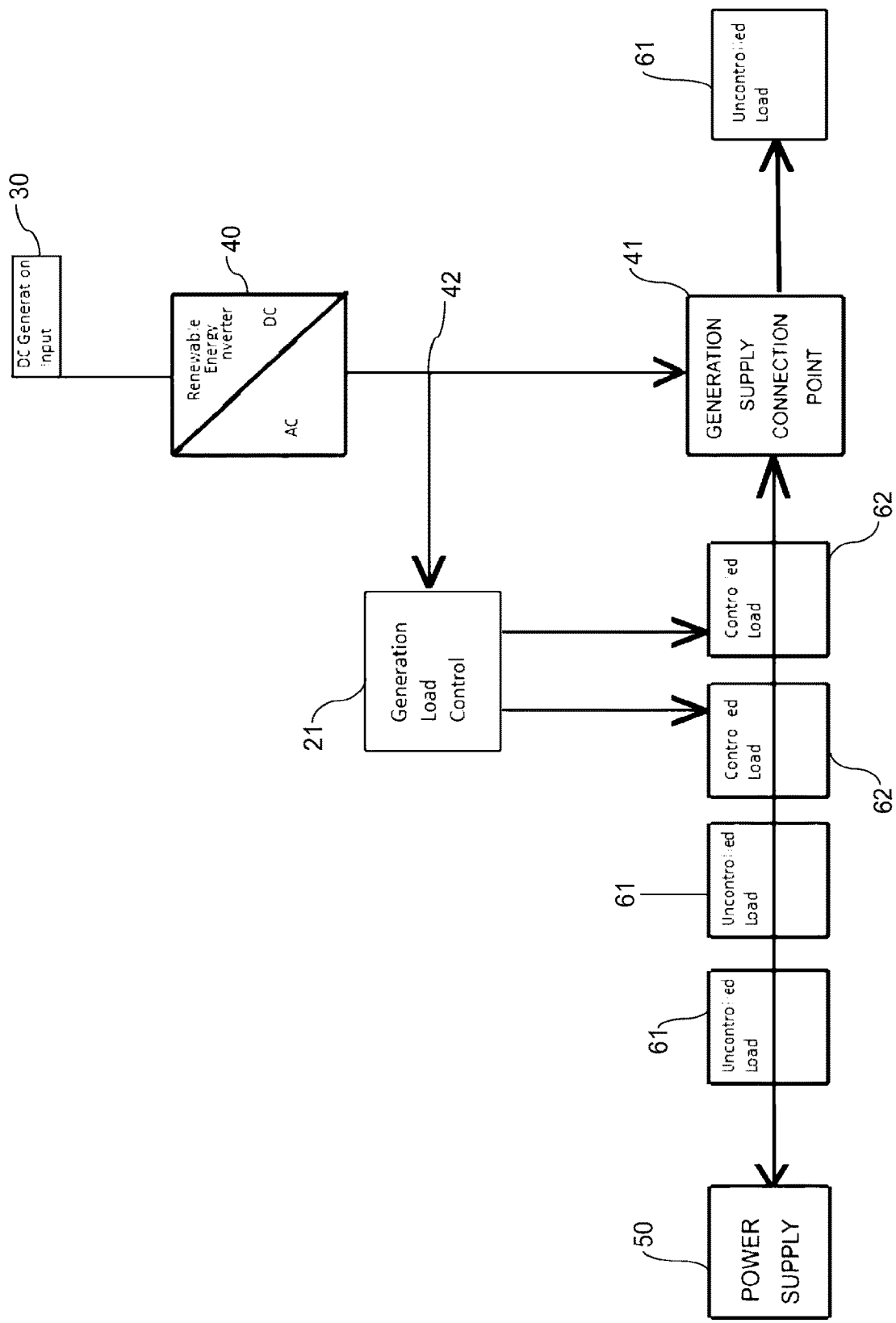
FIG. 3 illustrates a block diagram of the device using AC side sensing in accordance with an embodiment of the present invention.
Figure 4:
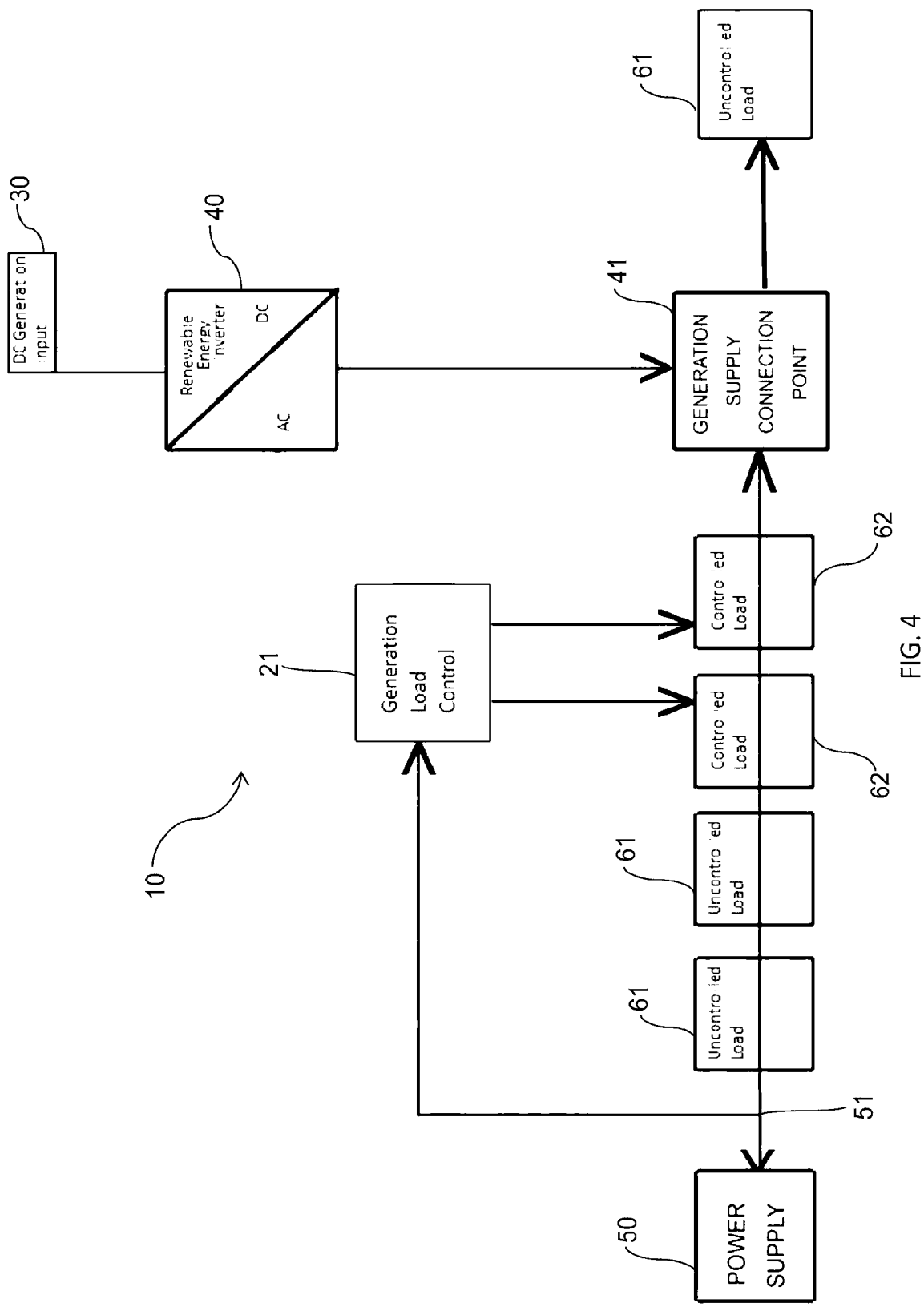
FIG. 4 shows a block diagram of the device using sensing at the mains switch in accordance with an embodiment of the present invention.
Figure 5:
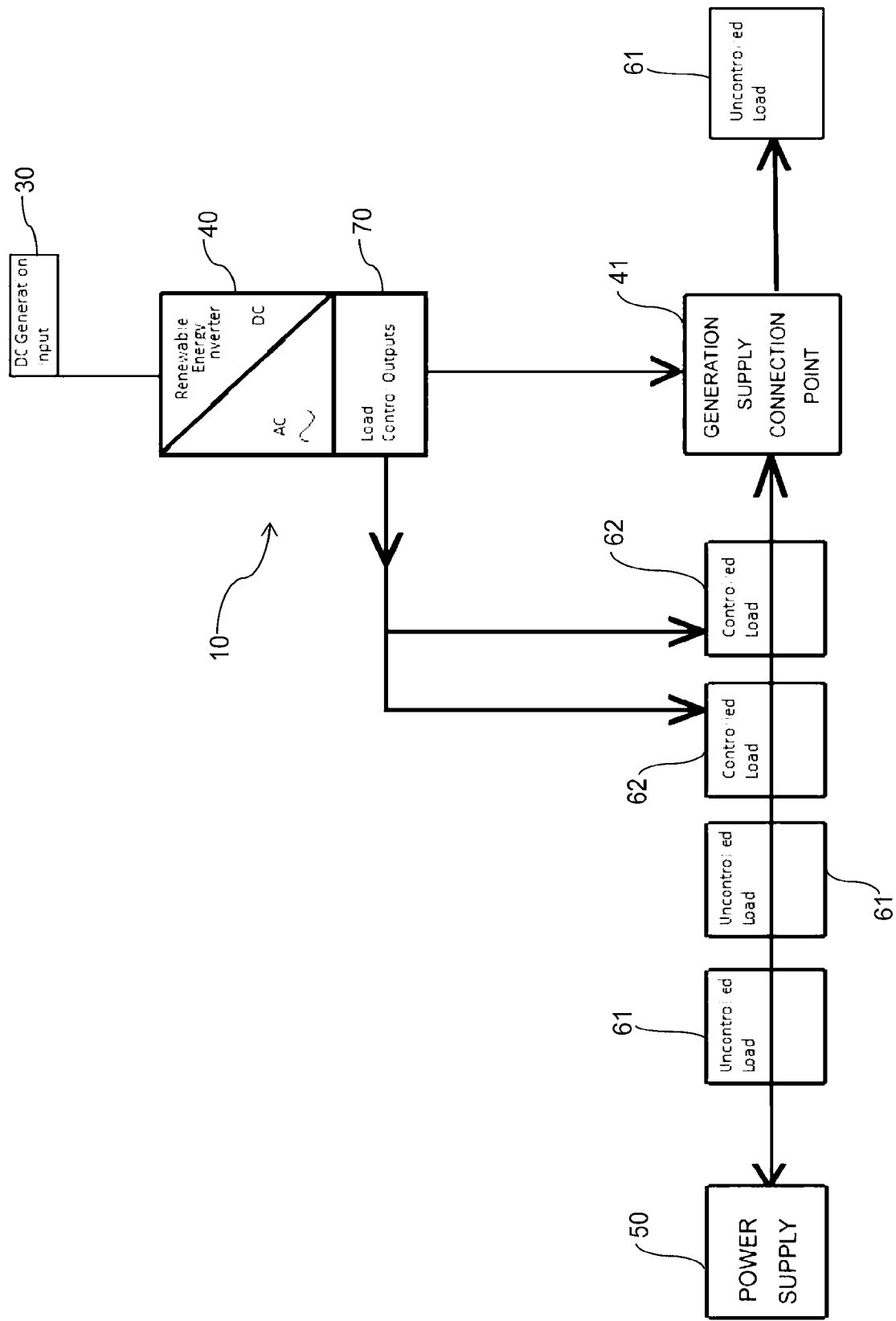
FIG. 5 shows a block diagram of a modified inverter incorporating the sensing and control in accordance with an embodiment of the present invention.

FIGS. 1 to 5 illustrate different embodiments of the present invention and typically only differ in the location regarding where the input from the energy sensor or sensing is taken. FIG. 1 illustrates the use of an independent sensor 20. In FIG. 2, the sensor input 22 is taken from the DC side of the DC generator 30. This can be taken directly from the DC side of the inverter 40, at or near the DC isolation switch at the output of the DC generator 30 or in parallel with one or more of the PV panels in the DC generator 30. FIG. 3 shows the sensor input 42 taken from the AC side of the inverter 40. FIG. 4 illustrates the sensor input 51 which senses the AC voltage at the electrical mains supply 50. FIG. 5 illustrates a further embodiment in which the load controller 70 forms part of the inverter 40_ This may be physically wired within the inverter 40 or may be a plug and play type device which is connected to the output of the AC side of the inverter 40. The input sensor in this embodiment is taken from the AC side of the inverter 40.

The sensor inputs 22, 42, 51 are typically bi-directional voltage and/or current sensing devices which sense the DC or AC voltage, current and power at the respective inputs. For example, the AC or DC current sensing devices may be whole current measuring devices or a current transformer which uses a primary conductor as the primary winding and a secondary coil that is coiled around a toroidal core that is positioned around a main conductor to measure the current. Likewise the voltage sensing device may be a voltage transformer or a potential transformer such as an instrument transformer.

FIGS. 1 to 5 all comprise similar components which are found in most solar photovoltaic fed grid installations. For example all circuits include a form of DC generation 30, an inverter 40, a generation supply connection point 41, uncontrolled and controlled loads 61, 62 and a mains power supply 50. Also as shown in FIGS. 6 to 12, a typical installation would also include a mains switch 90 which isolates the main power grid 50 from the electrical loads 61, 62. Likewise, a renewable energy main switch 44 would also isolate the renewable energy DC generator 30 from the mains power supply 50 and the electrical loads 61, 62.

FIGS. 6 to 10 illustrate embodiments of the present invention and in particular, the load controller 21 and the relays or switches 80, 81, 82, 83 which are controlled by the load controller 21 to open and close the controlled electrical loads 62. To isolate and energise the controlled loads 62 the load controller 21 uses contactors 80 to 83 (K1 to K4) to energise or isolate each electrical controlled load 62. Each contactor 80, 81, 82, 83 is an electrically controlled switch used for switching a power circuit. The contactors 80, 81, 82, 83 are controlled by an energising means or circuit 23, 24, 25, 26 with separate circuits used to energise each of the K1 to K4 contactors 80, 81, 82, 83. The DC generator 30 (renewable energy) and mains 50 also incorporates load isolation switches or circuit breakers 63, 64 which open should an error condition arise or protection device energises due to an over or under voltage, current or frequency. The switches 63, 64 will isolate and protect each electrical load 61, 62. Likewise the inverter 40 has both DC and AC isolators 32, 43 and circuit breaker 44 for protecting the inverter 40 which open should an error condition arise or protection device energises due to an over or under voltage, current or frequency. Finally the DC generator 30 has a DC isolator switch 31 to protect the DC generator 30 should an error condition arise or protection device energises due to an over or under voltage, current or frequency.

The electrically controlled loads 62 are switched by the load controller 21 when there is sufficient irradiance sensed by the sensor 20 or the sensor inputs 22, 42, 51. Likewise the electrically controlled loads 62 are switched off when the irradiance sensed decreases below a certain level. It should be noted that the switch on value set in the load controller 21 can be a different value to the switch off value set in the load controller 21. For example, if the energy sensor 20 is a 200 W solar panel at 50%, the output of the solar panel would be 100 W and at 200 W the output would be 100%. This equates to, or is directly proportional with, a DC generator 30 outputting 5 kW at 50% and 10 kW at 100%. The load controller 20 is setup to switch on a single 5 kW controlled load 62 when the sensor 20 outputs 100 W and could be programmed to switch off at say a value on the energy sensor of 80 W or 40%. The turn on value is different to the turn off value.

Figure 6:
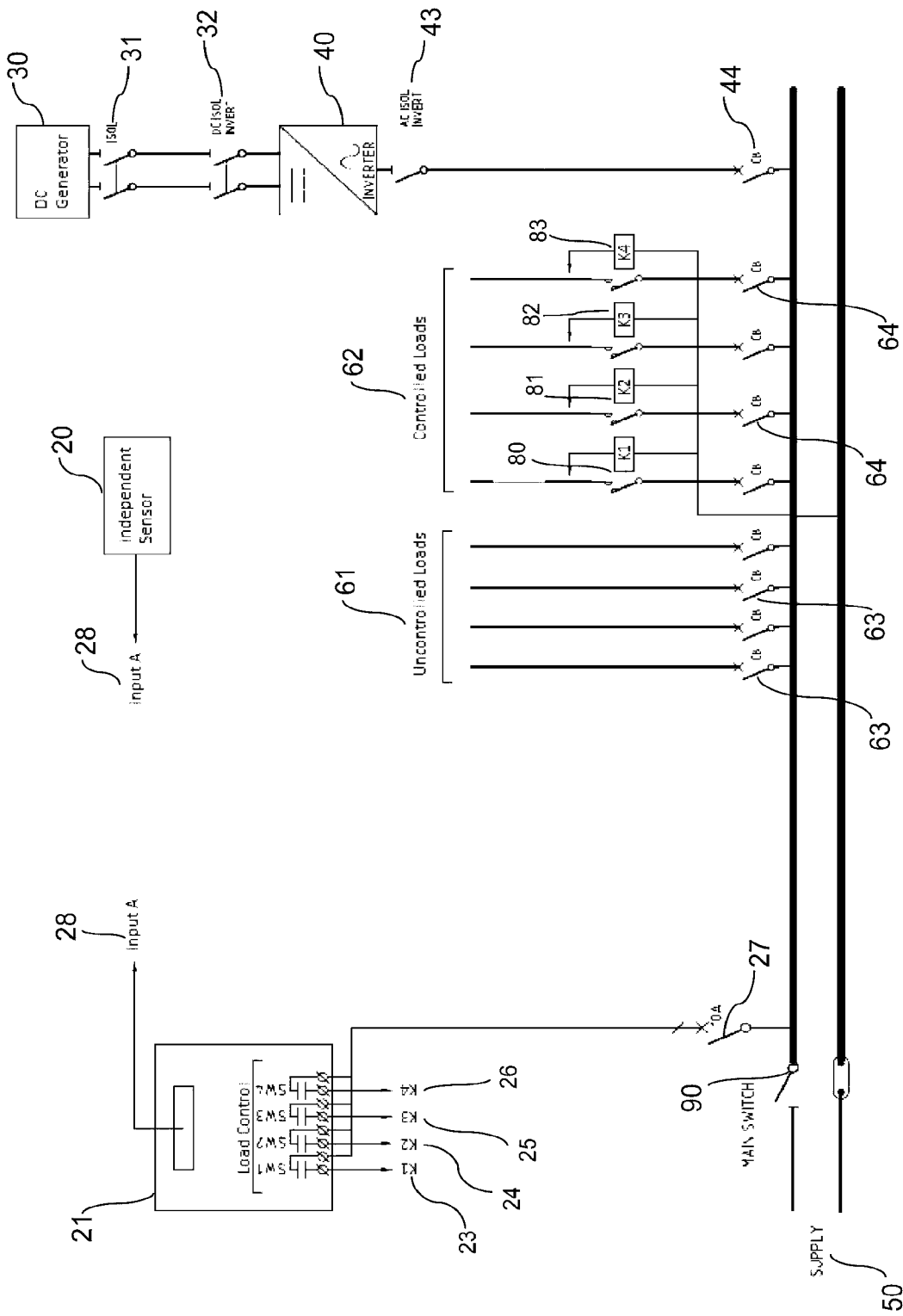
FIG. 6 illustrates a schematic single line diagram of the device of FIG. 1.

FIG. 6 illustrates a single line diagram of the use of the independent sensor 20 (Input A) as the input to the load controller 20 as was described above with reference to FIG. 1. The load controller 21 is electrically isolated from the mains by switch 27.

Figure 7:
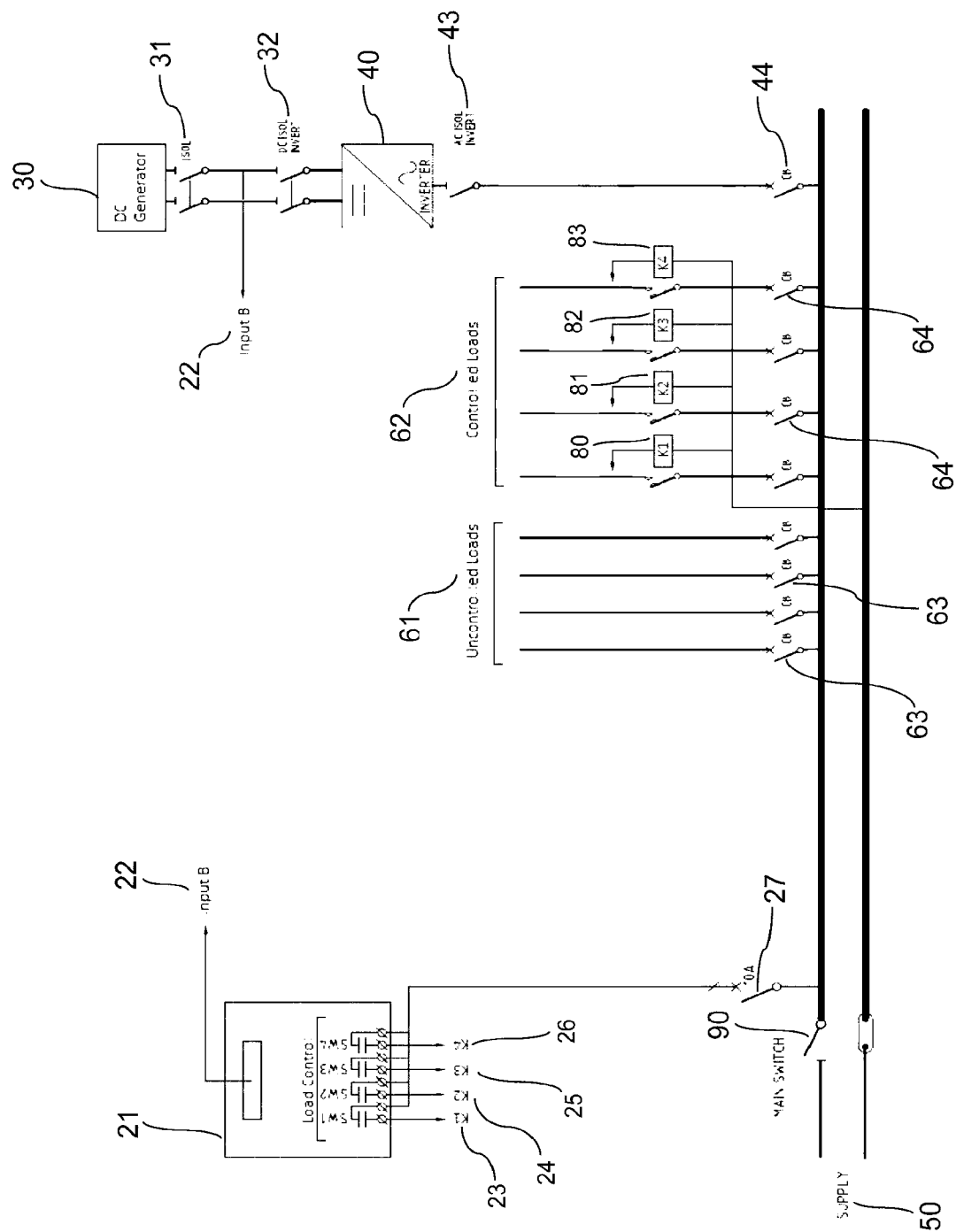
FIG. 7 illustrates a schematic single line diagram of the device of FIG. 2.

FIG. 7 illustrates a single line diagram of the use of the sensor input 22 (Input B) which is taken from the DC side of the DC generator 30 as was described above with reference to FIG. 2.

Figure 8:
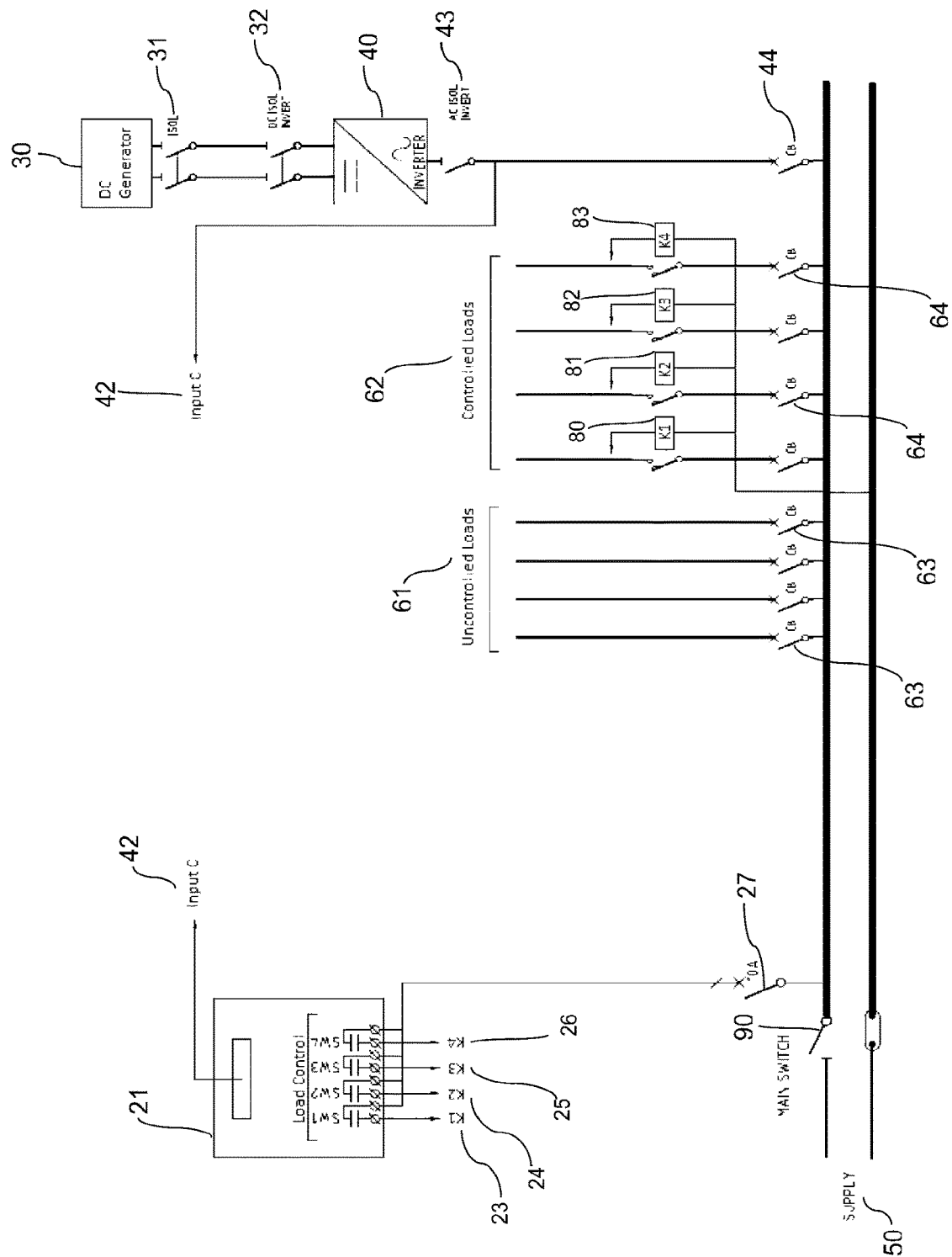
FIG. 8 illustrates a schematic single line diagram of the device of FIG. 3.

FIG. 8 illustrates a single line diagram of the use of the sensor input 42 (Input C) which is taken from the AC side of the inverter 40 as was described above with reference to FIG. 3.

Figure 9:
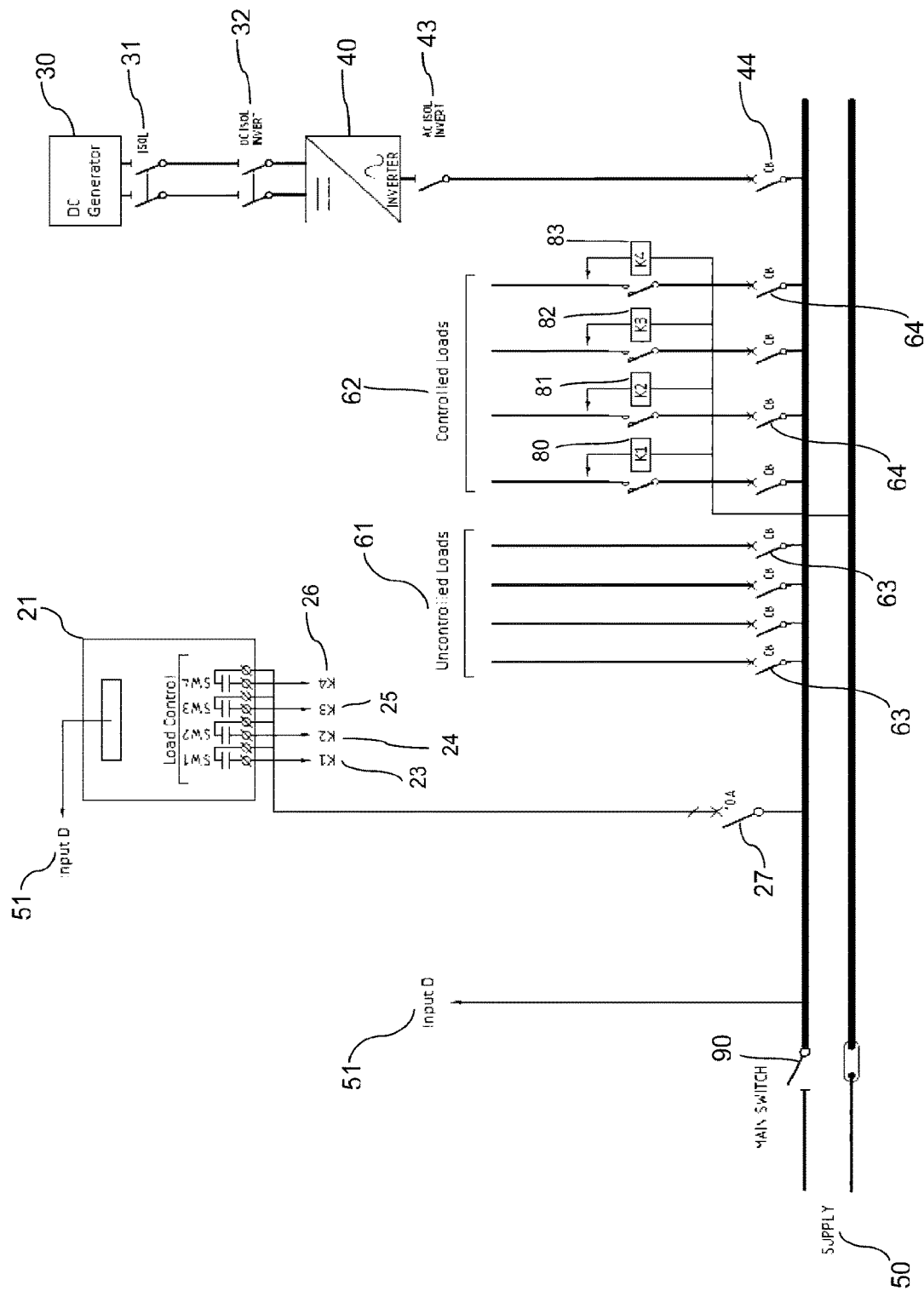
FIG. 9 illustrates a schematic single line diagram of the device of FIG. 4.

FIG. 9 illustrates a single line diagram of the use of the sensor input 51 (Input D) which is taken from the mains supply 50 as was described above with reference to FIG. 4.

Figure 10:
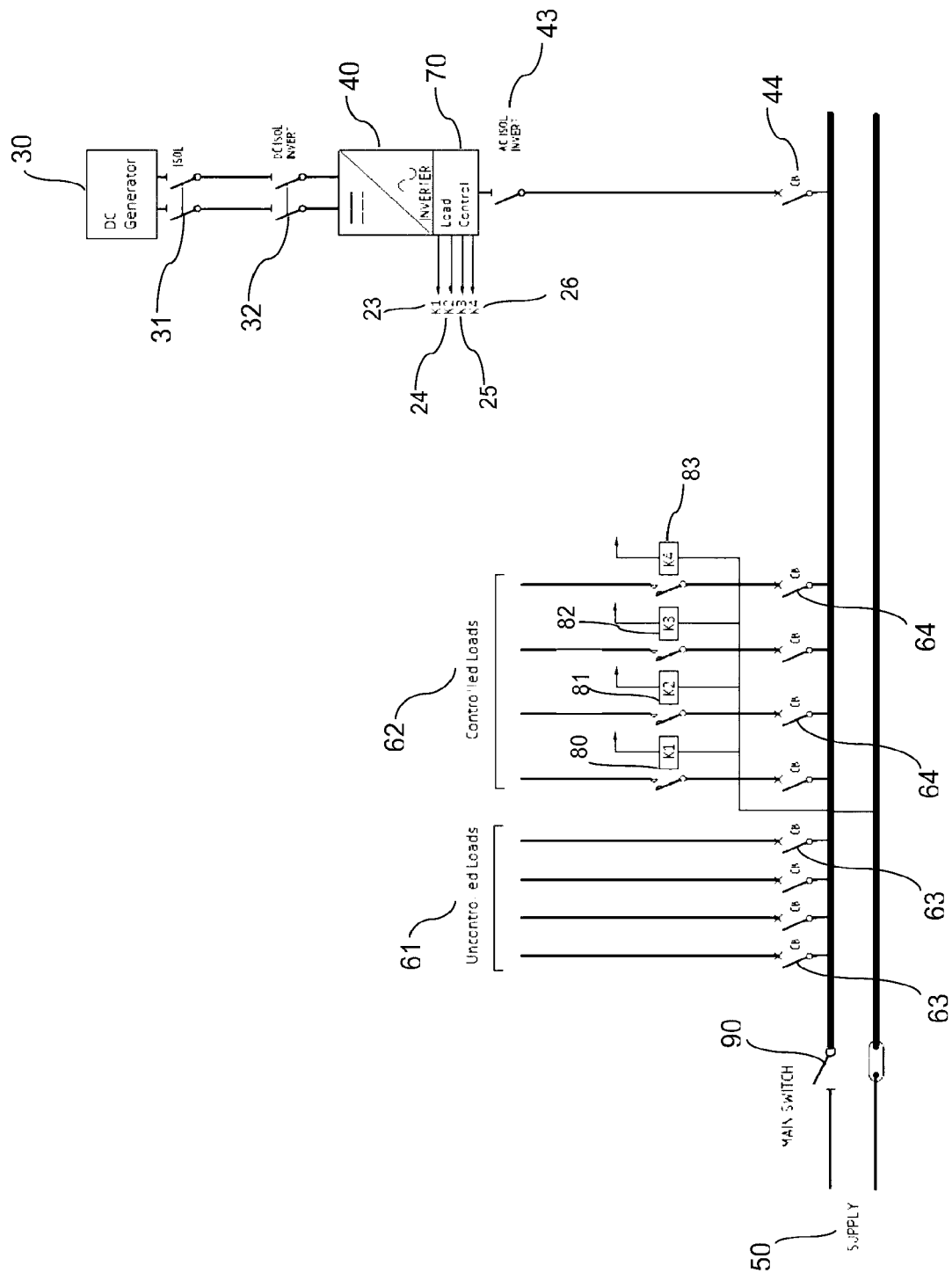
FIG. 10 illustrates a schematic single line diagram of the device of FIG. 5.

FIG. 10 illustrates a single line diagram in which the load controller 70 forms part of the inverter 40. The input sensor in this embodiment can be taken from the AC side or from the DC side of the inverter 40. Also, if manufactured in the inverter 40 it could form any part of the system, programming, measurements or references and could be taken from either side AC or DC or a combination of both.

Figure 11:
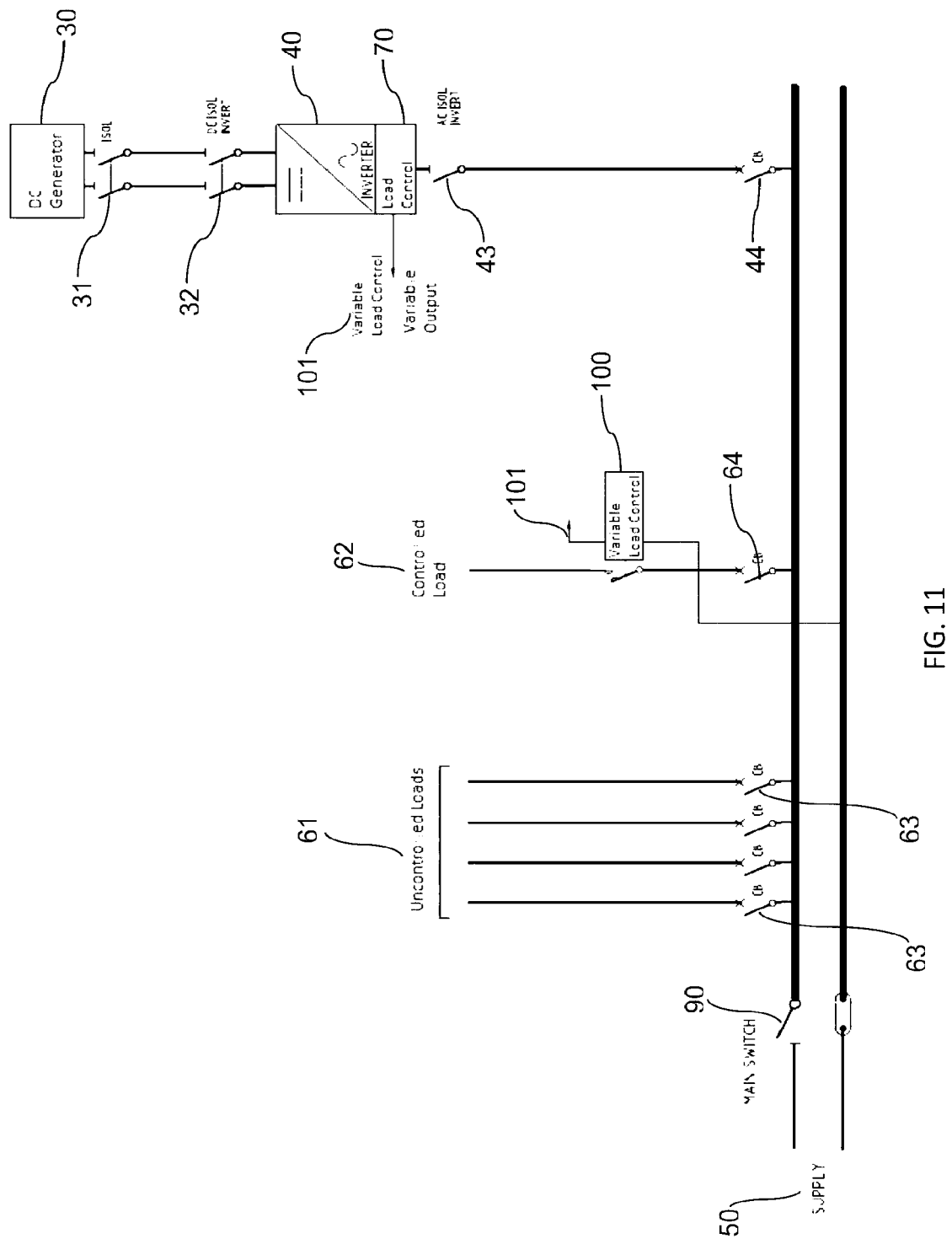
FIG. 11 shows a schematic single line diagram of the device of FIG. 5 used with a variable load control.
Figure 12:
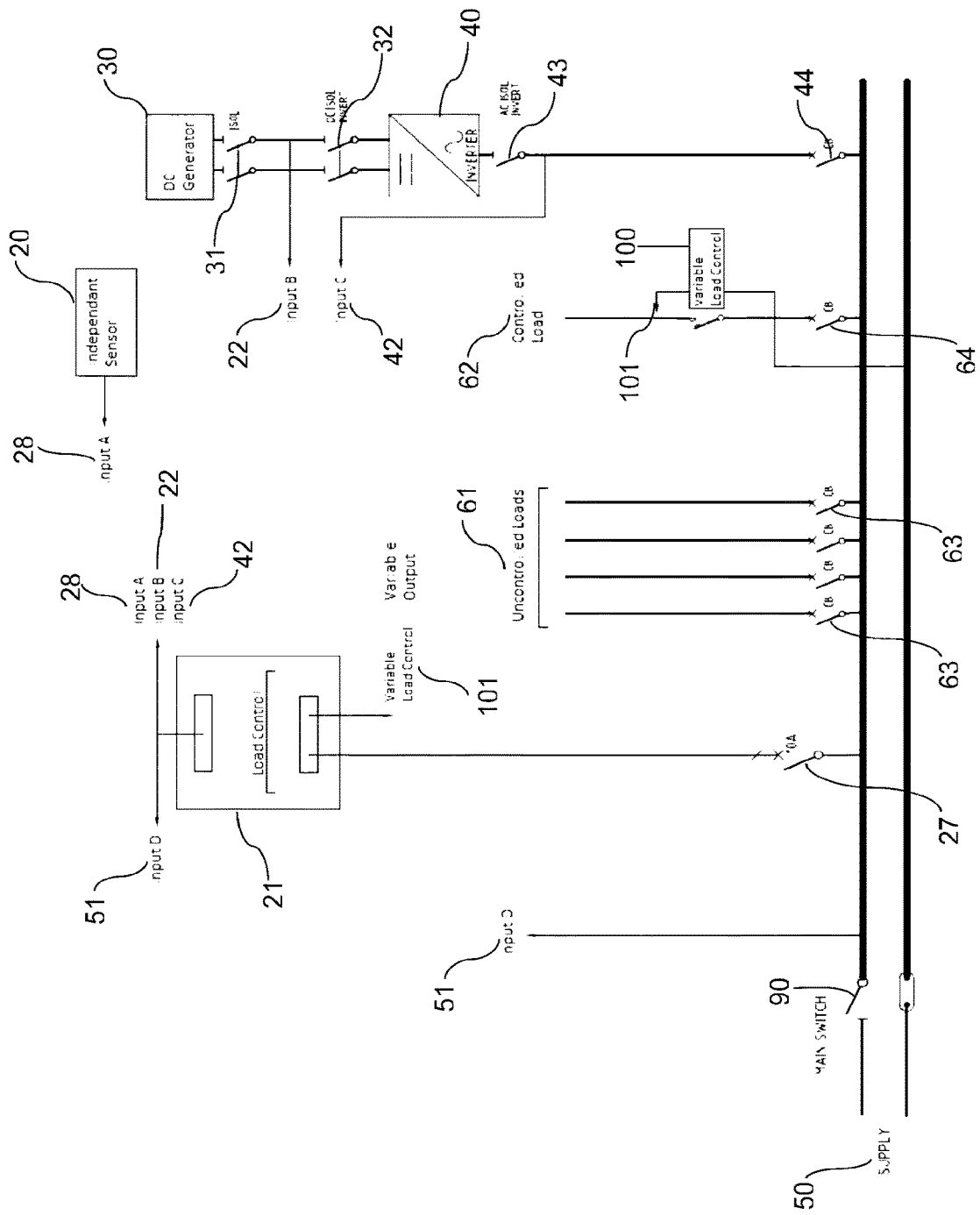
FIG. 12 illustrates a schematic single line diagram incorporating the device of FIGS. 1 to 4 and used with a variable load control.

FIGS. 11 and 12 illustrate an embodiment of the present invention used to control a variable load 100 such as a swimming pool pump. A variable load 100 is taken to be something that has variable changes in power requirements and there usually is no fixed pattern to these changes. FIG. 11 shows the variable controlled load 100 in which the load controller 70 forms part of the inverter 40. The input sensor in this embodiment is taken from the AC side of the inverter 40 with the output 101 of the load controller 70 used to control the variable load 100. FIG. 12 illustrates the remaining inputs A, B, C and D to the load controller 21 and the variable load control output 101 used to control the variable controlled load 100.

By way of further examples, a variable load control could be used for such items as a hot water system, slab heaters, air conditioning, pumps for irrigation, battery charging, or any generally non-essential loads. As the generation ramps down or decreases, instead of just turning off the load, the power input or available power to the load will decrease. The load will receive the left over energy in much the same way as a light globe does from a dimmer switch or a motor from a variable speed drive.

Figure 13:
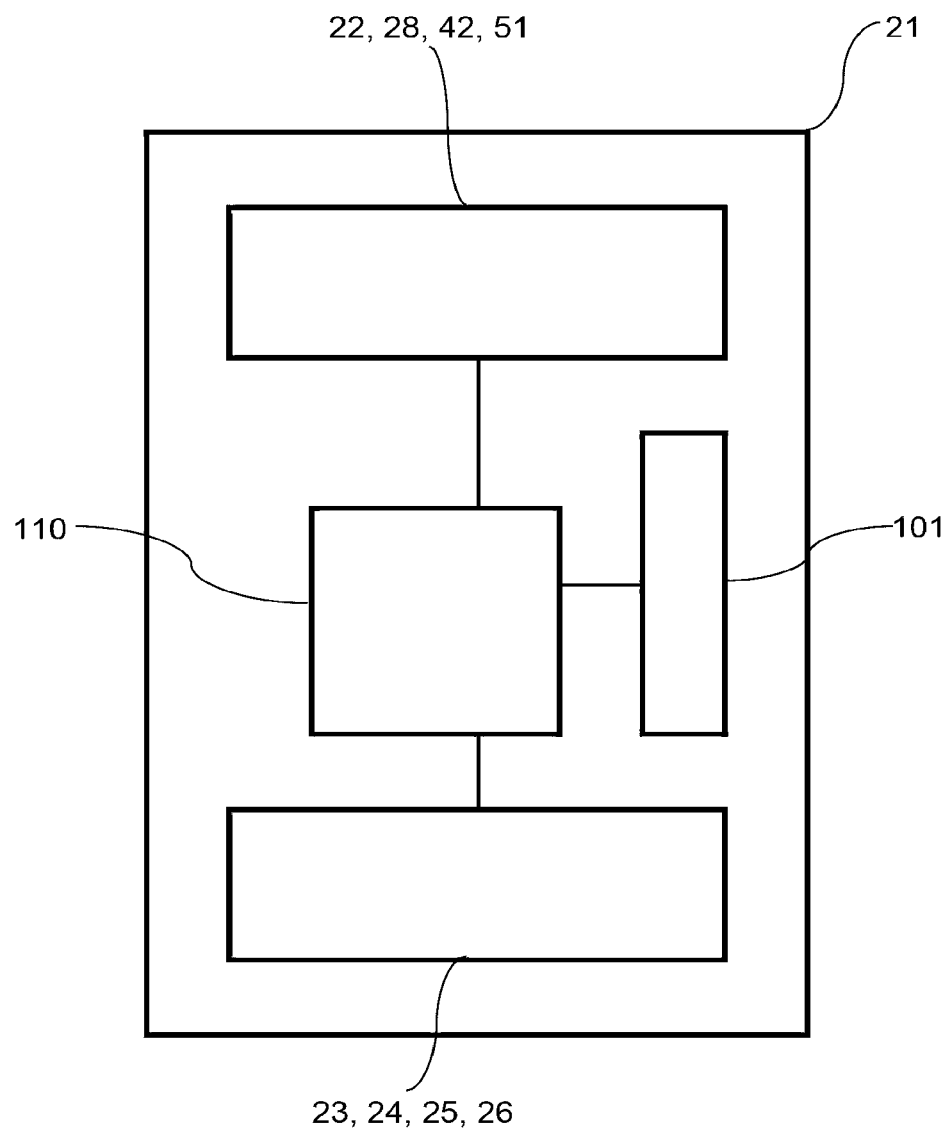
FIG. 13 shows a block diagram of the main components of the device of FIG. 1.

FIG. 13 shows a block diagram of the main components of the load controller 21. The load controller 21 comprises input 28 from the independent sensor 20 and sensor inputs 22, 42 and 51, outputs 23, 24, 25, 26 to the contactors 80, 81, 82, 83 for the controlled loads 62 and output 101 to the variable controlled load 100. To control the switching on and off of the controlled loads 62 and variable load 100 the load controller 21 incorporates a microprocessor 110. The microprocessor 110 may also include a display (not shown) and variable controls for changing the switch off setting to suit a particular load or installation. The switch off value can be either a variable control which can be manually adjusted or is automatically adjusted by software in the microprocessor 110. The microprocessor 110 typically incorporates the functions of a computer's central processing unit (CPU) on a single integrated circuit (IC), or at most a few integrated circuits. The microprocessor 110 is a multipurpose, programmable device that accepts digital data as input, processes it according to instructions stored in its memory, and provides results as output. The load controlling device 10 may also comprise a data network for transferring information between the plurality of electrical loads 61, 62, 100, the renewable energy DC generator 30, the energy sensor 20 or sensor outputs 22, 28, 42, 51 the controller means 21, the switching devices 80, 81, 82, 83, 101 and the electrical mains supply 50.

Figure 14:
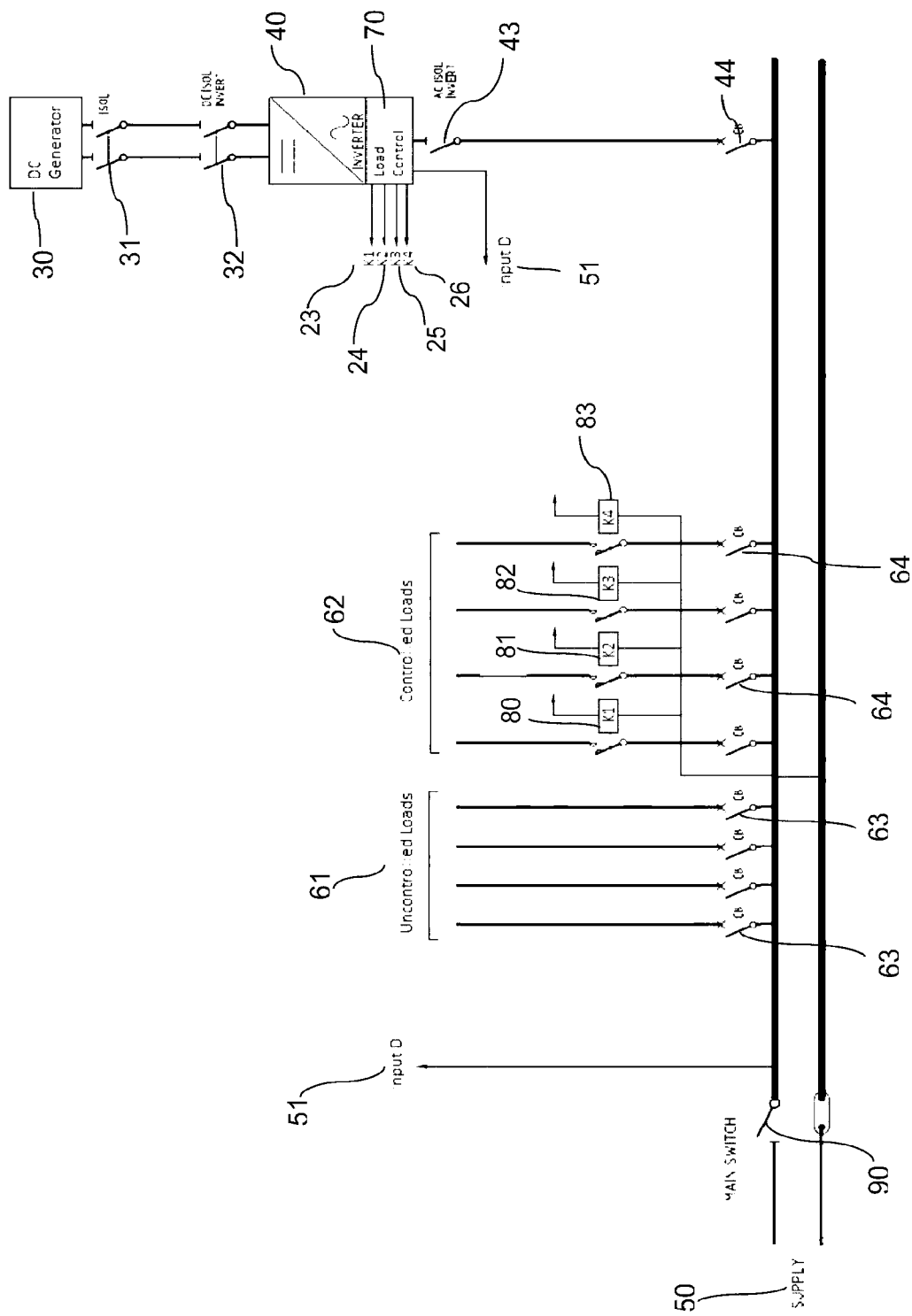
FIG. 14 illustrates a schematic single line diagram of the device of FIG. 5 using sensing at the mains switch in accordance with an embodiment of the present invention.

FIG. 14 illustrates a further embodiment of the present invention in which the load controller 70 forms part of the inverter 40. The main difference between FIGS. 5 and 14 is that the sensing input is at the mains switch 90. The outputs K1 to K4 of the load controller 70 control the opening and closing of contactors K1 to K4 of the controlled loads 62. As shown in FIGS. 5 and 14 the load controller 70 may be physically wired within the inverter 40 or may be a plug and play type device which is connected to the output of the AC side of the inverter 40. Alternatively, the plug and play device may be connected to the input or DC side of the inverter 40.

Figure 15:
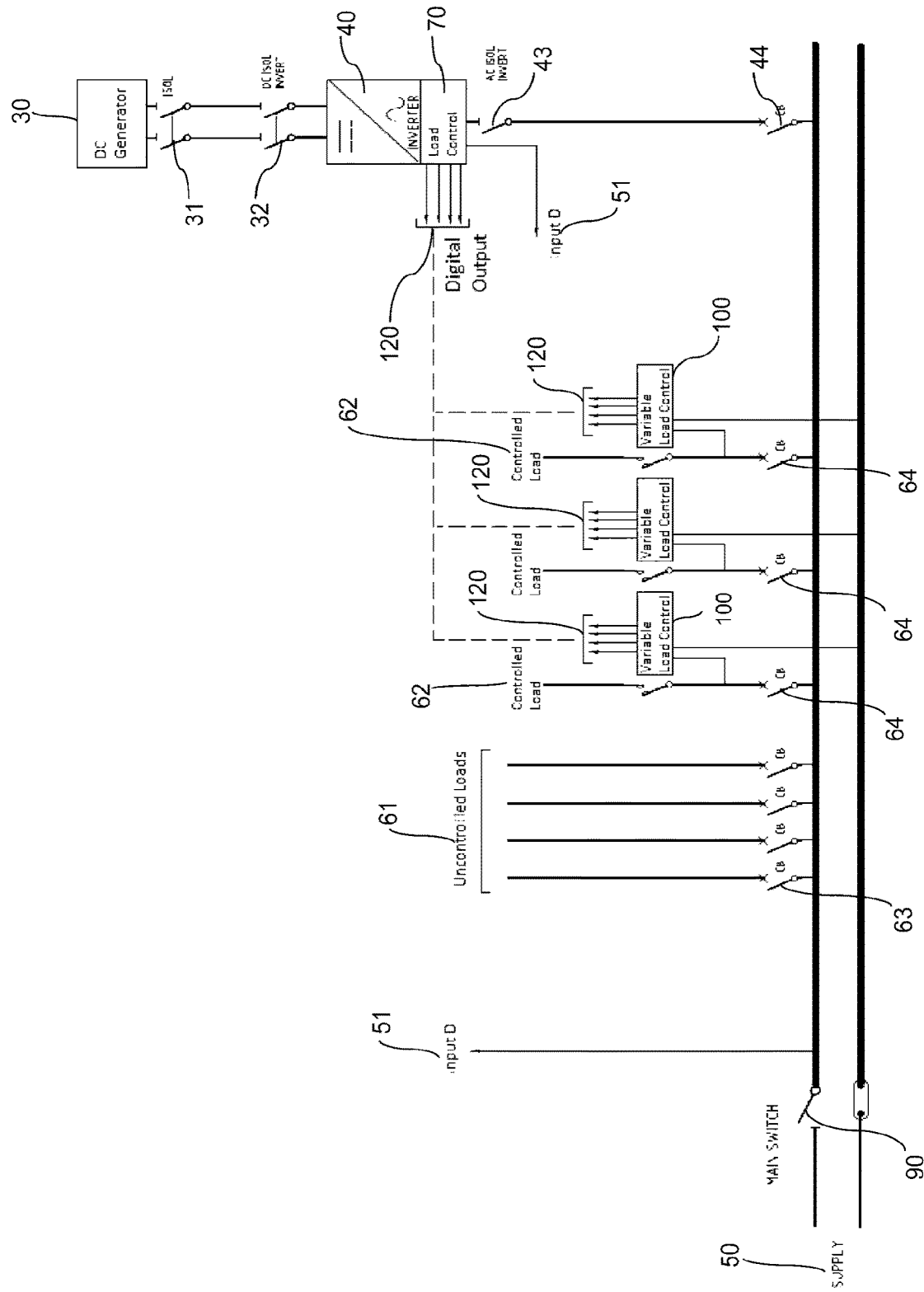
FIG. 15 illustrates a schematic single line diagram incorporating the device of FIG. 14 and using a digital output to control variable loads.
Figure 16:
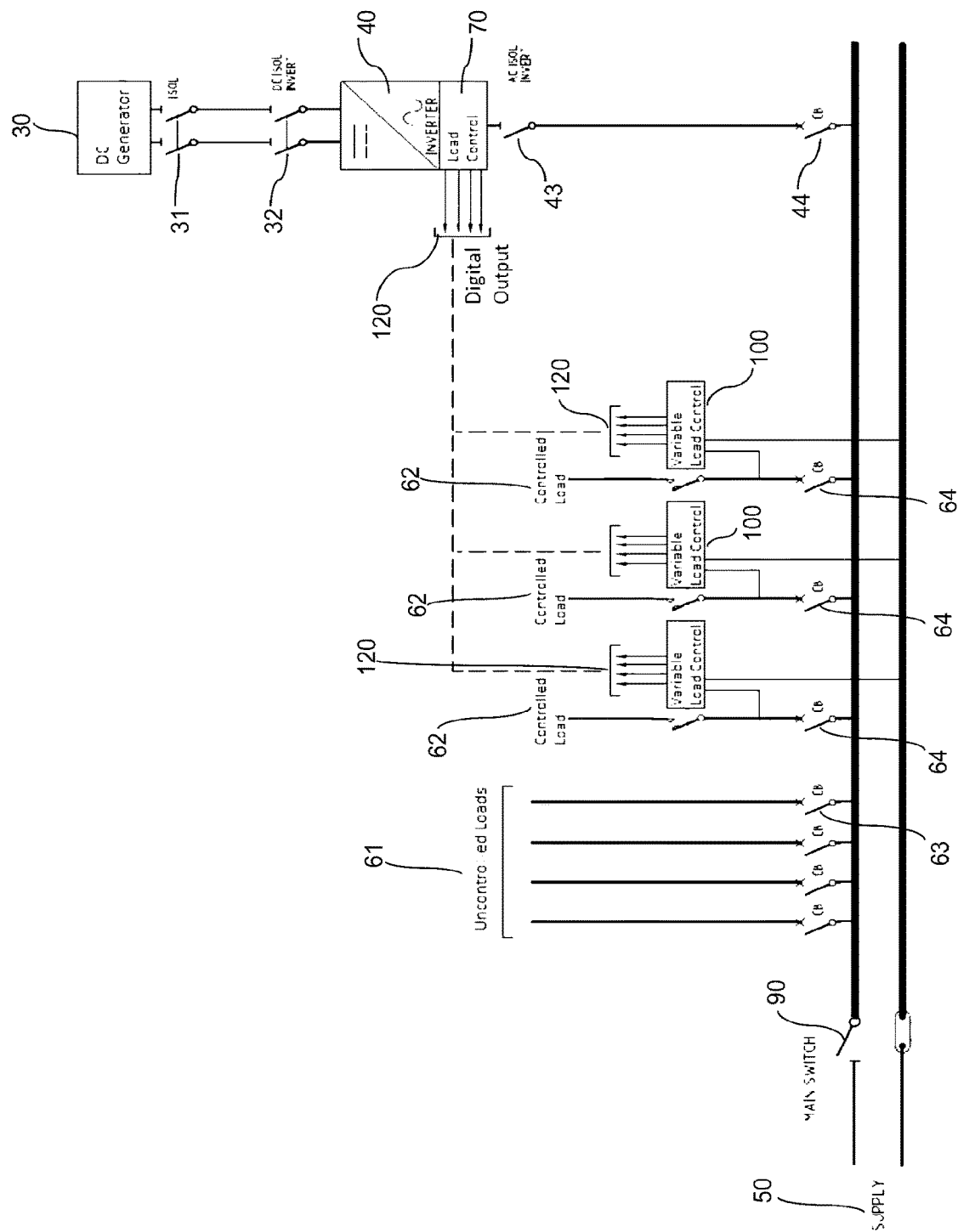
FIG. 16 shows a schematic single line diagram of the device of FIG. 5 and using a digital output to control variable loads.

FIGS. 15 and 16 also illustrate the load controller 70 forming part of the inverter 40 with digital output control switching 120 of the variable controlled loads 62, In FIG. 15 the input sensing is from the mains input 51 and in FIG. 16 the input sensing is taken from either the AC or DC side of the inverter 40. The digital signal or binary switching 120 includes any digital signal which is a physical signal that is a representation of a sequence of discrete values (a quantified discrete-time signal). In FIGS. 15 and 16 the variable controlled loads 62 can be ramped up or ramped down dependent upon the input sensed.

Figure 17:
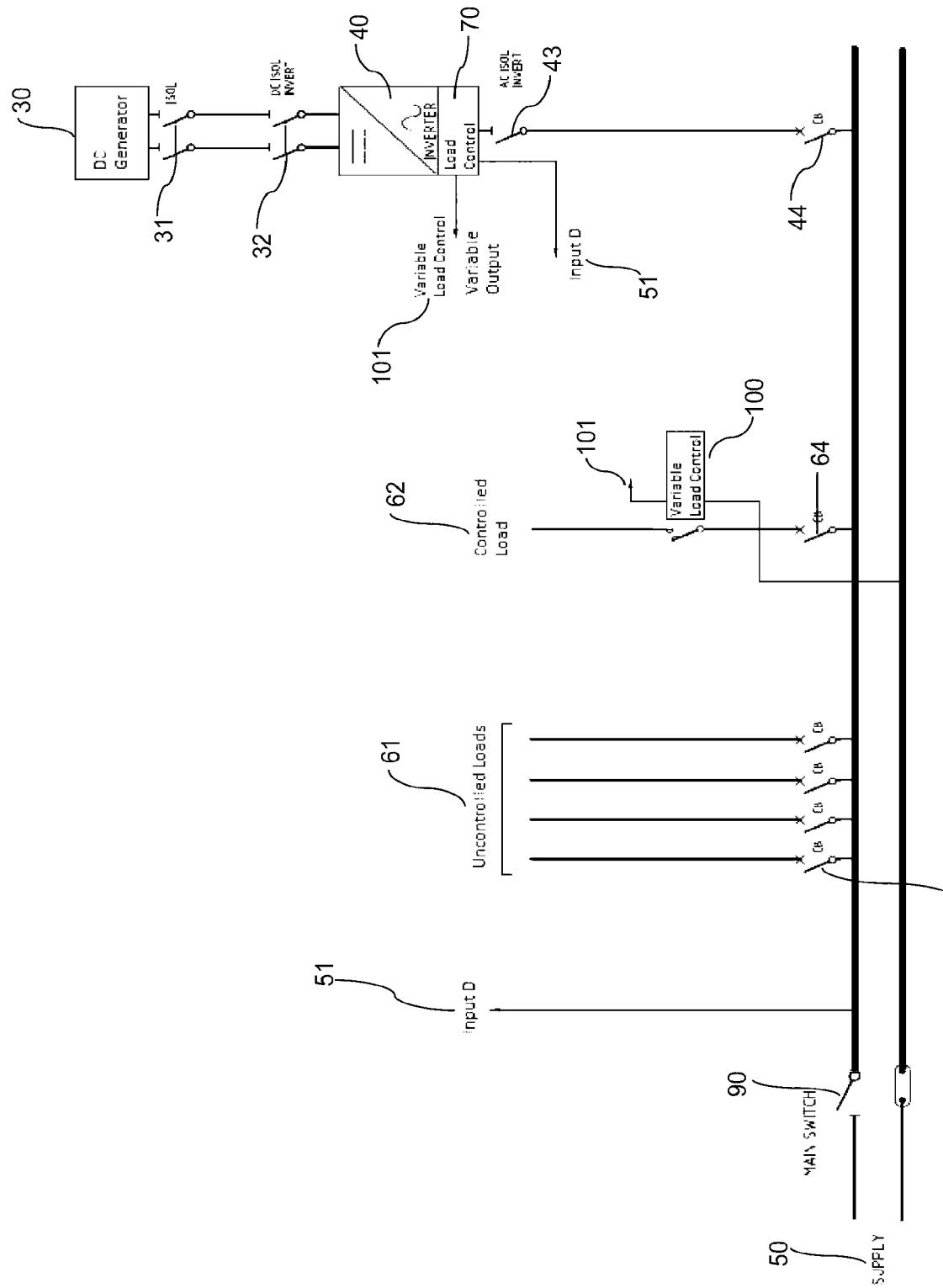
FIG. 17 illustrates a schematic single line diagram of the device of FIG. 5 using sensing at the mains switch to control a variable load.

FIG. 17 illustrates the load controller 70 forming part of the inverter 40 however the input sensing is taken from the mains input 51. Also the output is a variable load controller 101 as previously described.

Figure 18:
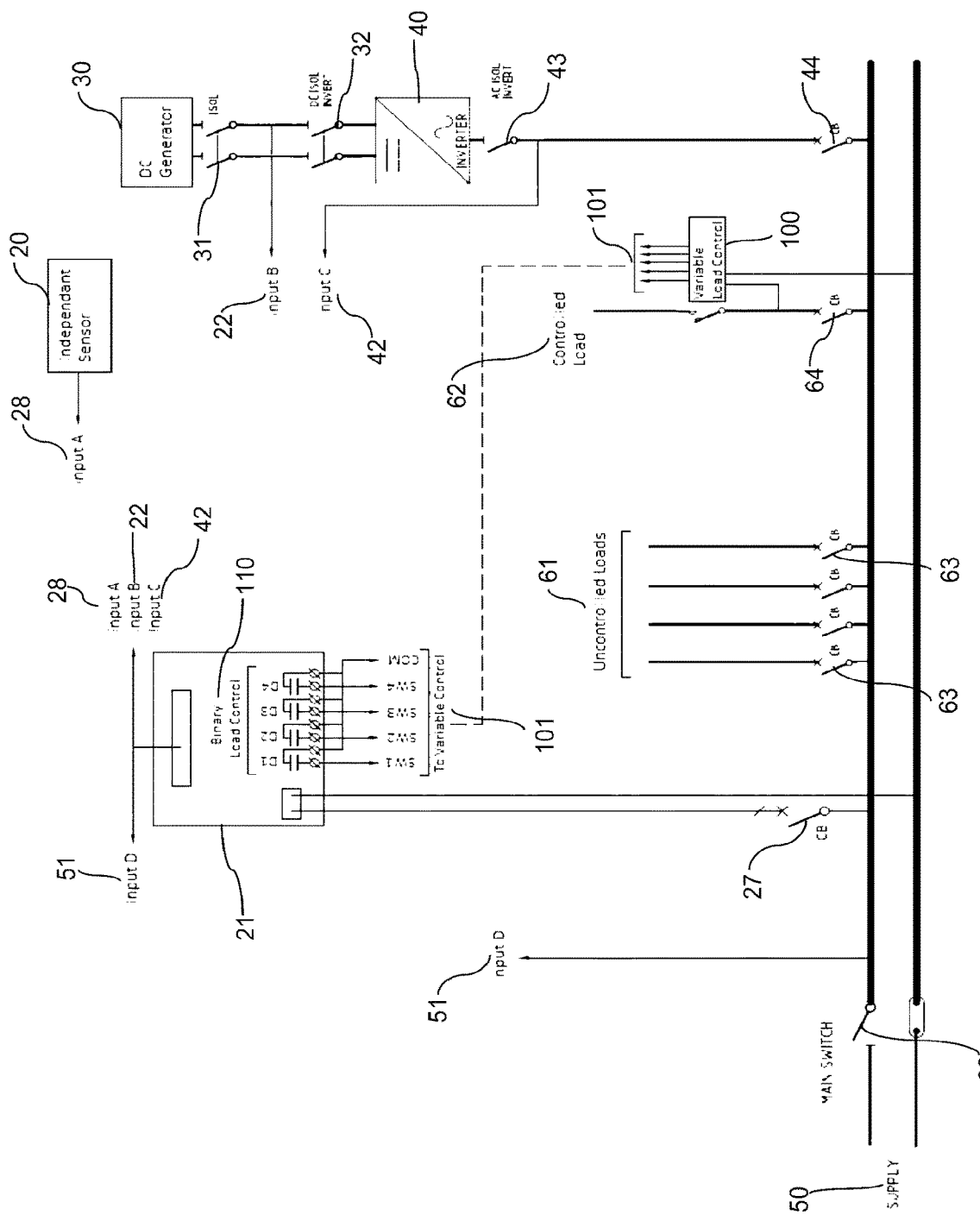
FIG. 18 illustrates a schematic single line diagram incorporating the device of FIGS. 1 to 4 and using binary controlled switching to control a variable load.
Figure 19:
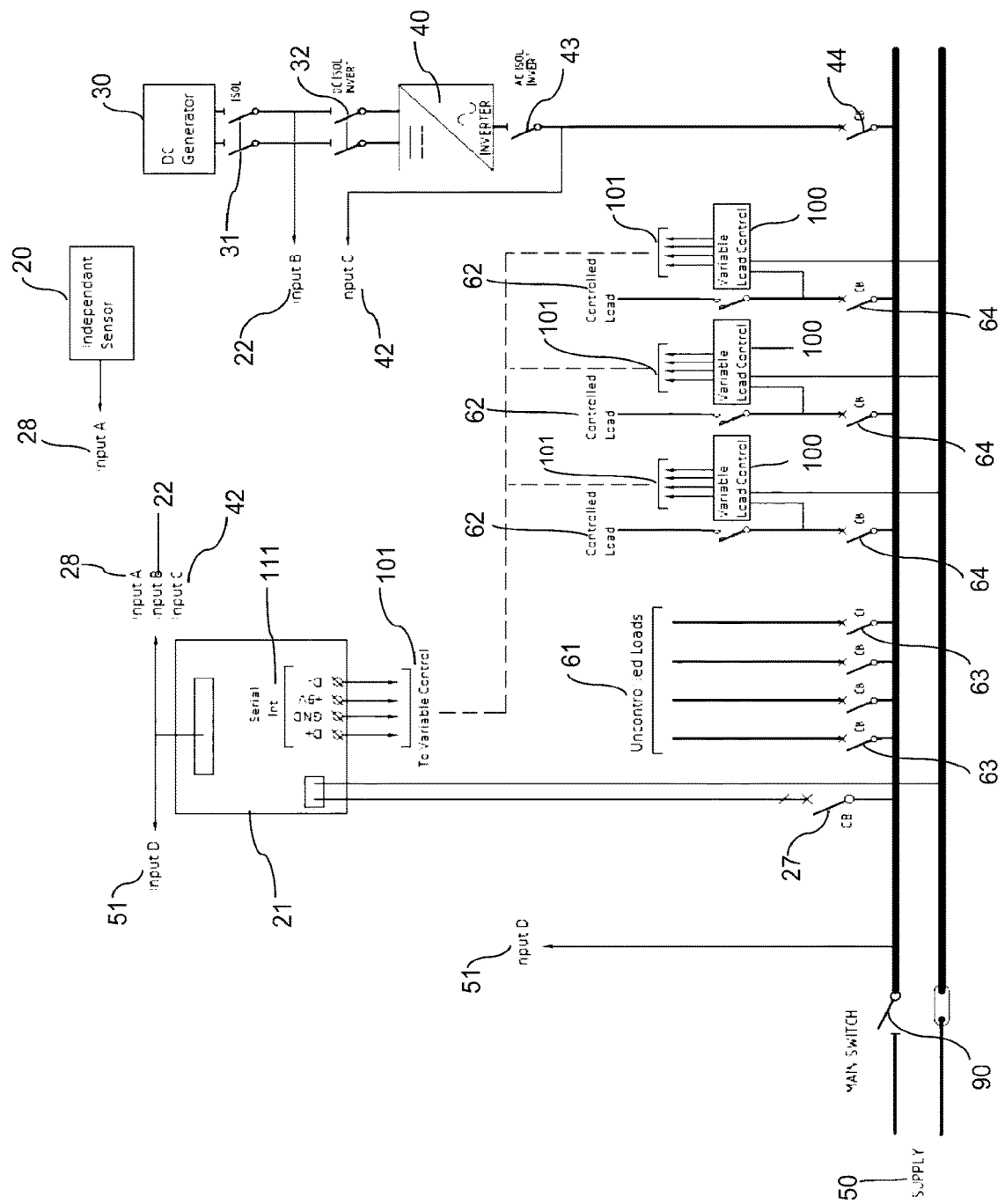
FIG. 19 illustrates a schematic single line diagram incorporating the device of FIGS. 1 to 4 and using RS 485 or digital controlled switching to control variable loads.

FIG. 18 shows the binary load control switching 110 used in conjunction with the load controller 21 and a single variable load 62. Likewise FIG. 19 illustrates a serial interface 111 (RS 485) used to control a plurality of variable controlled loads 62.

As shown in most figures, the installation may also comprise uncontrolled loads 61 which are not switched by the load controller 21.

The present invention provides a device 10 which will measure and monitor irradiance using a sensor or sensing device and/or the DC voltage or current (or power) input to the inverter and/or AC voltage or current (or power) output from the inverter, to produce an energy parameter which will be directly proportional to the amount of energy output from the DC generating system. This value is best represented as a percentage value measured by the sensor device and is equal to the percentage value of the output of the DC generating system. The use of a percentage value is only used to aid in best representing the energy parameter as a value which can be easily equated to other values other than a percentage_ For example, the value may be represented as a ratio (i.e. a relationship between two numbers of the same kind) or simply as a parameter (i.e. as a characteristic, feature, or measurable factor) that can help in defining a particular system. By way of further example the energy parameter may include the available percentage value if the IES is ramping back because of a zero net feed in. In other words, when the forward power equals the reverse fed power in the system.

The load controller 21 is used to connect additional load to a site as the value or availability of solar energy increases. This provides the advantage of only running the controlled loads when solar energy is available. Likewise the present invention provides the ability to turn off the connected controlled loads when the solar energy decreases.

Embodiments of the present invention can be implemented with single or multiple switching devices. The load controller 21 may control multiple switches 80, 81, 82, 83. The operation, order of operation, combination of switching, etc. of multiple switches can be preset or programmable in the load controller 21 microprocessor 110. This can be to suit percentage of inputs from the sensor 20 or sensor inputs 22, 28, 42, 51, controlled loads 62, or combinations of controlled loads 62 with variable controlled loads 100. For example, switches 80, 81, 82, 83 may ramp up one after the other; the switches may ramp down in the reverse one after the other; the switches may be evenly spaced or by ratio, etc.; the switches may work independently with no influence upon each other; or the closing and opening values of each switch can be preset or adjustable by a variable control or with programming. With electronic or programmed switching, this may be achieved using digital or binary style switching. Likewise, the controller 21 may also have a serial port or an RS 485 port.

The digital signal or binary switching includes any digital signal which is a physical signal that represents a sequence of discrete values (a quantified discrete-time signal), for example of an arbitrary bit stream, or of a digitized (sampled and analogue-to-digital converted) analogue signal. The term digital signal can refer to any continuous-time waveform signal used in digital communication representing a bit stream or other sequence of discrete values, or a pulse train signal that switches between a discrete number of voltage levels, also known as a line coded signal or baseband transmission for example, a signal found in digital electronics or in serial communications, or a pulse coded modulation (PCM) representation of a digitized analogue signal.

The serial port is a serial communication physical interface through which information transfers in or out one bit at a time. The RS 485 is a standard defining the electrical characteristics of drivers and receivers for use in balanced digital multipoint systems. Digital communications networks implementing the RS 485 standard can be used effectively over long distances and in electrically noisy environments. Multiple receivers may be connected to such a network in a linear, multi-drop configuration. These characteristics make such networks useful in industrial environments and similar applications.

Any of the above described switching topologies could supply values/etc, to an automated system that could use this information. For example the information could be used as a site dependent preference of use, time of use, for home or industry.

Embodiments of the present invention may be configured such that the controlled loads 62 or variable controlled load 100 to switch on, or are closed to connect, so that when the monitoring devices input reaches a value, the corresponding switch will close. With multiple switches, different combinations and order of switching can occur. Likewise the off value, or switch opening, once the irradiance has dropped below the value to close a switch can be varied. For example, the off value can be less or equal to the on value. This differential can be preset or adjustable via a variable control. An open value less than closing value provides a differential to prevent cycling, which allows load to remain connected and possibly use a portion of its energy from the grid and also provides a designer's preference, and flexibility regarding device use and applications.

The following examples are provided by way of example only and should not be considered limiting with respect to possible uses of devices, systems and methods according to the invention_ A skilled addressee will readily understand that many different uses are available with respect to embodiments of the present invention_ The following examples describe existing solar installations that generate more energy than is used in a site at various times during the day_

Example 1—in a typical home when occupants leave, a large portion of renewable energy may be exported to the power grid. A load controlling device 10 will allow non-essential loads to use the excess power available from the renewable sources. For example heating hot water systems, pool filtering, air conditioning, etc, which can be connected or disconnected to absorb any excess available power thus avoiding any export of power to the grid.

Example 2—a farmer pumps water from a bore to fill a dam only when excess renewable sourced power is available and a float switch can be used to turn the irrigation pumps off. Rather than using "off peak power" or "controlled tariff power" from the grid, unwanted solar generated power is used instead when it is available, to fill the dam rather than exporting excess power back into the grid.

Example 3—a system, method and/or controlling device according to the present invention may be configured with variable load outputs which ramp up and down to suit excess load. For example with hot water heaters, with resistive elements, "heat pump" style heating or air conditioners with inverter air conditioner units, motors already ramp up and down to suit the load. Similarly, pool pumps ramp the speed of the pump motor up and down. Accordingly, variable loads could be ramped up and down to suit any excess generation beyond that required for essential loads thus enabling excess renewable power generation to be used for the exemplified purposes rather than being fed back into the grid.

It will also be recognised by skilled readers that methods of operating a control device according to the present invention allows users to control the connection and disconnection of electrical loads taking into account the available supply of power sourced by renewal energy sources and considering the total flow of power between the power grid and the premises to which renewable energy generators are connected. The measurement of power flow (including the amount and direction of power flow) enables a user to program a load controlling device to substantially avoid exporting power from the premises to the power grid and hence avoid or reduce the effects of localised voltage regulation problems caused by feeding power from a premises into the grid.

Further, skilled readers will also appreciate that methods of operating a load control device may be implemented according to the present invention that enable users to monitor the amount of power flowing from a power grid to the premises and activating the load control device to either connect renewable energy sources or, disconnect nonessential loads, in order to avoid, or reduce the incidence, of the premises drawing power from the grid exceeding the peak power demand threshold.

Of course, it will be recognised that references to electrical power, and in particular, reference to measurement of electrical AC power in this specification include measuring the separate components of real power and reactive power.

Variations

It will be realized that the foregoing has been given by way of illustrative example only and that all other modifications and variations as would be apparent to persons skilled in the art are deemed to fall within the broad scope and ambit of the invention as herein set forth.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Therefore, at least the following is claimed:

1. A load controlling device for substantially avoiding export of energy from at least one renewable energy generator to an electrical power grid, the load controlling device configured to reduce export of renewable electrical energy to the power grid whilst maintaining connection between the renewable energy generator, the premises and the electrical power grid, said plurality of electrical loads supplied by at least one renewable energy generator and/or the electrical power grid, wherein the at least one renewable electrical energy generator is configured to derive energy from a renewable energy source; said load controlling device comprising:

a bi-directional voltage and/or current sensing device configured to sense the AC voltage and/or current between the electrical power grid and a premises and provide a sensor input to a controller means, the sensor input indicating the direction of power flow between the electrical power grid and the premises;

a switching device for connecting one or more non-essential electrical loads supplied by the at least one renewable energy generator and the electrical power grid based on an output of the controller means;

wherein the load controlling device varies the output of the controller means according to the sensed direction of power flow between the electrical power grid and the premises to cause the switching device to connect one or more non-essential electrical loads until power flow in the direction from the premises to the electrical power grid is not sensed by the bi-directional voltage and/or current sensing device.

2. A load controlling device according to claim 1, wherein the renewable energy generator comprises a solar photovoltaic generator and an inverter for converting the direct current (DC) from the solar photovoltaic generator to alternating current (AC).

3. A load controlling device according to claim 1, wherein the bi-directional voltage and/or current sensing device is built into the inverter.

4. A load controlling device according to claim 3, wherein the inverter is programmable to recognize its output power and operable to connect or disconnect the one or more non-essential electrical loads as the output of the inverter varies with the sensed power flow between the electrical power grid and the premises.

5. A load controlling device according to claim 1, wherein the current sensing device is a a current transformer which uses a primary conductor as the primary winding and a secondary coil that is coiled around a toroidal core positioned around a main conductor.

6. A load controlling device according to claim 1, wherein the voltage sensing device is a voltage transformer or a potential transformer.

7. A load controlling device according to claim 1, wherein the processing means further comprises a switch on value and a switch off value for controlling the connection of the one or more non-essential loads as the sensed power flow between the electrical power grid and the premises varies.

8. A load controlling device according to claim 7, wherein the switch off value and the switch on value are two different values.

9. A load controlling device according to claim 7, wherein the switch on and the switch off value is a variable control which can be manually adjusted or is automatically adjusted according to computer instruction code executed in the processing means.

10. A load controlling device according to claim 1, wherein the switching device further comprises one or more electrically controlled switches operable by the processing means to connect the one or more non-essential electrical loads.

11. A load controlling device according to claim 10, wherein the electrically controlled switch comprises a switching circuit in the controller means and an electromagnetic coil and contacts located in line with the at least one electrical load to connect the one or more non-essential electrical loads.

12. A load controlling device according to claim 10, wherein the device comprises a plurality of electrically controlled switches operable by the processing means to connect the one or more non-essential electrical loads.

13. A load controlling device according to claim 12, wherein the switches and associated one or more non-essential electrical loads are connected and disconnected to control the amount of electrical power consumed as the sensed power flow between the electrical power grid and the premises varies.

14. A load controlling device according to claim 12, wherein the switches and associated one or more non-essential electrical loads are operable according to the computer instruction code executed by the processing means and programmed to control the amount of load connected or disconnected as the sensed power flow between the electrical power grid and the premises varies.

15. A load controlling device according to claim 1, wherein the one or more non-essential electrical loads comprises at least one controlled load and at least one uncontrolled load.

16. A load controlling device according to claim 15, wherein the one or more non-essential electrical loads comprises fixed and variable loads.

17. A load controlling device according to claim 15, wherein at least one of the controlled loads comprises at least one variable load.

18. A load controlling device according to claim 17, wherein the processing means, under the control of computer instruction code, causes supply of electrical power to the variable load with a varying amount of power to suit the variable load.

19. A load controlling device according to claim 1, further comprising a data network for transferring information between the plurality of electrical loads, the renewable energy generator, the energy sensor, the controller means, the switching device and the electrical power grid.

20. A method for controlling a plurality of non-essential electrical loads to substantially avoid export of energy from at least one electrical energy generator to an electrical power grid, said plurality of non-essential electrical loads supplied by the at least one renewable energy generator connected to a premises and the electrical power grid, wherein the at least one renewable energy generator derives energy from a renewable energy source; said method comprising the steps of:
  a) sensing, by a bi-directional voltage and/or current sensing device, the AC voltage and/or current between the electrical power grid and the premises and providing a sensor input to a controller, the sensor input indicating the direction of power flow between the electrical power grid and the premises;
  b) determining the non-essential electrical loads to be connected by the controller on the basis of the sensed direction of power flow between the electrical power grid and the premises;
  c) connecting one or more non-essential electrical loads based on an output of the controller, wherein the controller is configured to reduce export of renewable energy to the power grid, whilst maintaining connection between the renewable energy generator, the premises, and the electrical power grid until power flow in the direction from the premises to the electrical power grid is not sensed by the bi-directional voltage and/or current sensing device.

21. Computer instruction code executable on a computer processor for controlling at least one of a plurality of non-essential electrical loads to substantially avoid export of energy from a renewable energy generator to an electrical power grid, said plurality of non-essential electrical loads being supplied by the renewable energy generator connected to a premises and/or an electrical power grid, wherein the renewable energy generator derives energy from a renewable energy source; the computer instruction code causing:
  sensing, by a bi-directional voltage and/or current sensing device, the AC voltage and/or current between the electrical power grid and the premises and providing sensor input to a controller, the sensor input indicating the direction of power flow between the electrical power grid and the premises;
  determination of the non-essential electrical loads that can be connected by the controller according to the sensed direction of power flow between the electrical power grid and the premises; and connection of one or more non-essential electrical loads based upon an output of the controller, until power flow in the direction from the premises to the electrical power grid is not sensed by the bi-directional voltage and/or current sensing device, wherein the controller is configured to reduce export of renewable energy to the power grid whilst maintaining connection between the renewable energy generator, the premises, and the electrical power grid.

22. A load controlling device according to claim 1, wherein the switching device is further configured to disconnect one or more non-essential electrical loads when the bi-directional voltage and/or current sensing device senses power flow from the electrical power grid to the premises.

23. A method according to claim 20, further comprising disconnecting one or more non-essential electrical loads when the bi-directional voltage and/or current sensing device senses power flow from the electrical power grid to the premises.

24. Computer instruction code according to claim 21, wherein the computer instruction code further causes the switching device to disconnect one or more non-essential electrical loads when the bi-directional voltage and/or sensing device senses power flow from the electrical power grid to the premises.

* * * * *